(12) United States Patent
Hall et al.

(10) Patent No.: US 9,710,944 B2
(45) Date of Patent: Jul. 18, 2017

(54) ELECTRONIC DOCUMENT THINNING

(71) Applicant: Apple Inc., Cupertino, CA (US)

(72) Inventors: David M. Hall, Brush Prairie, WA (US); Martin J. Murrett, Portland, OR (US); Christopher E. Rudolph, Camas, WA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 13/657,807

(22) Filed: Oct. 22, 2012

(65) Prior Publication Data

US 2014/0111516 A1    Apr. 24, 2014

(51) Int. Cl.
*G06T 11/60*    (2006.01)
*G06F 17/21*    (2006.01)

(52) U.S. Cl.
CPC ............ *G06T 11/60* (2013.01); *G06F 17/212* (2013.01)

(58) Field of Classification Search
CPC ..................... G06F 17/30905; G06F 2216/17
See application file for complete search history.

(56) References Cited

U.S. PATENT DOCUMENTS

| | | | |
|---|---|---|---|
| 6,857,102 B1* | 2/2005 | Bickmore | G06F 17/2247 707/E17.121 |
| 2003/0161401 A1* | 8/2003 | Shen et al. | 375/240.16 |
| 2005/0071364 A1* | 3/2005 | Xie et al. | 707/102 |
| 2007/0250768 A1* | 10/2007 | Funakami | G06F 17/30905 715/210 |
| 2007/0291297 A1* | 12/2007 | Harmon | G06F 17/212 358/1.15 |
| 2012/0131427 A1* | 5/2012 | Artin | G06F 17/211 715/201 |
| 2012/0192080 A1* | 7/2012 | Lloyd | 715/744 |
| 2013/0145258 A1* | 6/2013 | Reilly et al. | 715/249 |

* cited by examiner

*Primary Examiner* — Daniel Hajnik

(74) *Attorney, Agent, or Firm* — Fletcher Yoder PC

(57) ABSTRACT

A system for authoring, publishing, and distribution of electronic documents is provided. The system includes a content authoring and publishing application to author and publish electronic documents, a content distribution system to distribute electronic documents, and a set of user devices that include digital content viewing applications that are used to read the electronic documents. The content authoring and publishing application is used to author and publish high-resolution versions of electronic documents. The high-resolution version of each document is associated with a set of annotations for each high-resolution image in the document. The annotations allow an electronic document thinning tool in the content distribution system to create a low-resolution version of each image and generate a low-resolution version of the electronic document without receiving low-resolution images from the author of the document.

22 Claims, 16 Drawing Sheets

ELECTRONIC DOCUMENT THINNING

BACKGROUND

Electronic documents such as ebooks, electronic magazines, electronic newspapers, etc., have become very popular in recent users. The electronic documents are often managed and distributed by content distribution systems that receive requests for accessing different electronic documents, authorize the requests, and download or send a copy of each requested document to the authorized devices.

Different electronic devices such as tablets, ebook readers, smart phones, and personal computers are widely used to read these documents. These electronic devices, however, have different display capabilities. For instance, many newer versions of tablets have high-resolution displays while the older versions have low-resolution displays. Sending a high-resolution version of an electronic document that has high-resolution images to a device with low-resolution display wastes the resources of the device since the user of the device cannot experience the high-resolution images dues to the low-resolution of the device display.

BRIEF SUMMARY

Some embodiments provide a system for authoring, publishing, and distribution of electronic documents. The system includes a content authoring and publishing application to author and publish electronic documents, a content distribution system to distribute electronic documents, and a set of user devices that include digital content viewing applications that are used to read the electronic documents.

The content authoring and publishing application is used to author and publish electronic documents. The application utilizes the images and other digital assets such as text, audio, video, etc., to generate an electronic document at the highest resolution required to display the document on user devices with high-resolution displays. Once the user of the application (i.e., the author of the document) is done preparing the electronic document, the high-resolution document is published and uploaded to a content distribution system.

In some embodiments, the electronic document is a structured electronic document. In these embodiments, a file such as a markup language file is used to provide additional information such as a list of digital assets of the document, the reading order, and the metadata for different assets. In addition, the authoring and publishing application calculates the maximum resolution required to display each image of the electronic document on a user device with low-resolution display screen. The application then annotates the markup language file to specify the maximum resolution required for each image to be displayed on a low-resolution display.

The annotations are used by a thinning tool in the content distribution system to create a low-resolution version of the electronic document. The calculation of the maximum resolution required for displaying each image on a low-resolution display screen, annotation of the markup language file, and creation of the low-resolution version of the electronic document are all done without requiring the author to provide different resolutions for each image. The author just provides images at best (or at any) resolution available and the system for authoring, publishing, and distribution of electronic documents automatically generates two versions of the electronic document and distributes them to user devices based on the display capabilities of the user devices.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
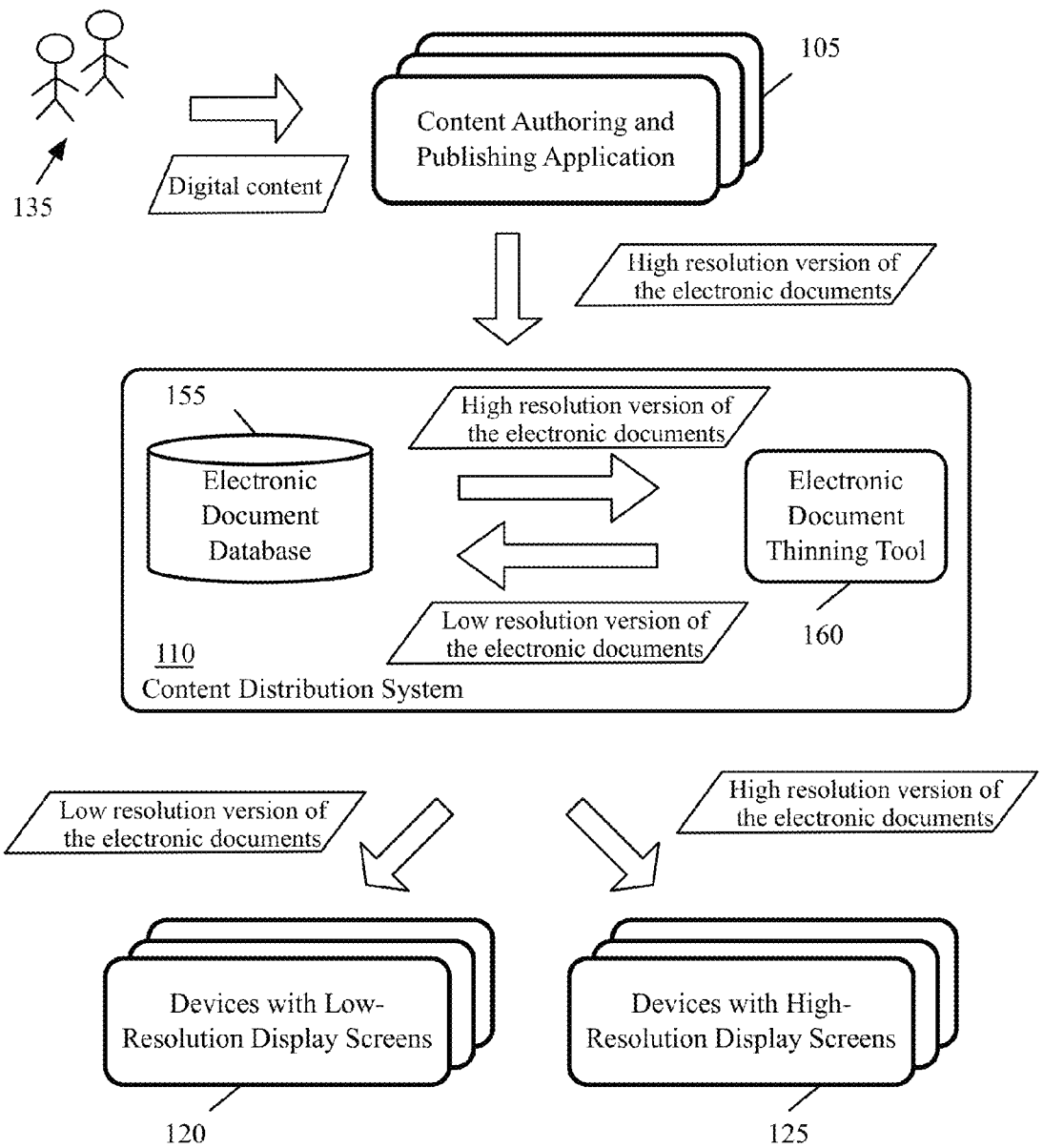
FIG. 1 conceptually illustrates a high-level diagram of a system for authoring, publishing, and distribution of electronic documents in some embodiments of the invention.

FIG. 1 conceptually illustrates a high-level diagram of a system for authoring, publishing, and distribution of electronic documents in some embodiments of the invention. As shown, the system includes user devices 105 that are used to author and publish electronic documents, a content distribution system 110, and several user devices 120-125 that are utilized to read the electronic documents.

Each of the user devices 105 includes a content authoring and publishing application that is utilized by a user to author and publish an electronic document. The content authoring and publishing application is utilized to create a high-resolution version of the electronic document. Examples of electronic documents include electronic books, electronic magazines, electronic newspapers, electronic articles, etc. As discussed further below, the system also creates a low-version of the each document without requiring the author/user of a document to provide multiple versions of images or requiring the content authoring and publishing applications to use time and resources on the authors' devices 105 to create the low-resolution versions of the documents.

As shown, the content authoring and publishing application in each device 105 receives digital content from the author/users 135 and generates high-resolution versions of the electronic documents. The application in some embodiments includes each image in the electronic document with a resolution that is required to display the image on a high-resolution display screen. For instance, when the user provides an image that is 5000-by-5000 pixels but the resolution required to display the image on a high-resolution display screen is 1000-by-1000 pixels, the application down samples the image to 1000-by-1000 pixels and includes it in the document. On the other hand, if the image provided has only 700-by-700 pixels or 1000-by-1000 pixels and the resolution required to display the image on a high-resolution display screen is 1000-by-1000 pixels, the application includes the image in the document with the received resolution.

Once the application includes an image in a document, the application also automatically determines the resolution required to display the same image on a low-resolution display screen. For instance, the application determines that the same image only requires 500-by-500 pixels to be displayed on a low-resolution display screen. The application associates a set of annotations with the high-resolution version of each image to specify the resolution required to display the image on a low-resolution display screen. Details of generating annotating for the high-resolution images are described in the section titled "Creating low-resolution versions of electronic documents without requiring the author to provide low-resolution images," below.

Once the electronic document is completed (e.g., when the user/author decides to publish the document), the content authoring and publishing application sends the electronic document with high-resolution images and the associated annotations to a content distribution system. The content distribution system 110 includes an electronic document thinning tool 160, which receives the documents with high-resolution images and the annotations associated with the high-resolution images. The electronic document thinning tool 160 creates a low-resolution version of the electronic document by creating a low-resolution version of each image based on the associated annotations and including the low-resolution version of the images in the low-resolution version of the document. For instance, if an image is included in the document with 2048-by-1536 pixels (e.g., to cover the full screen of a high-resolution tablet) and the associated annotations specify a 1024-by-768 pixels resolution for the low-resolution version of the image (e.g., to cover the full screen of a low-resolution tablet), the process creates the low-resolution version of the image by down sampling the image from 2048-by-1536 pixels to 1024-by-768 pixels.

The electronic document thinning tool 160 creates the low-version of the images without requiring the author/user 135 of a document to provide multiple versions of an image or requiring the content authoring and publishing applications to use time and resources on the author's device 105 to create the low-resolution versions of the images. Once a document is available on the content distribution system, user devices 120-125 request access to the document. In some embodiments, each requesting user device also provides its display capabilities. In other embodiments, the content distribution system determines the display capabilities based on the type of the device. The content distribution system then provides the appropriate version of the document to each requesting device based on the display capabilities of each device.

Several more detailed embodiments of the invention are described in sections below. Section I describes creating low-resolution versions of electronic documents without requiring the author to provide low-resolution images in some embodiments. Next, Section II describes providing the appropriate version of a document to different user devices based on user device display capabilities. Section III describes the software architecture of some embodiments. Finally, a description of an electronic system with which some embodiments of the invention are implemented is provided in Section IV.

I. Creating Low-Resolution Versions of Electronic Documents without Requiring the Author to Provide Low-Resolution Images Some embodiments provide a content authoring and publishing application to author and publish electronic documents. The application utilizes the images and other digital assets such as text, audio, video, etc., to generate an electronic document at the highest resolution required to display the document on user devices with high-resolution displays. Once the user of the application (i.e., the author of the electronic document) is done preparing the document, the document is published and uploaded to a content distribution system.

In some embodiments, the electronic document is a structured electronic document. In these embodiments, a file such as a markup language file is used to provide additional information such as a list of digital assets of the document, the reading order of the document, and the metadata associated with different content assets of the document. The authoring and publishing application calculates the maximum resolution required to display each image of the electronic document on a user device with low-resolution display screen. The application then annotates the markup language file to specify the maximum resolution required for each image to be displayed on a low-resolution file. The annotations are used by a thinning tool in the content distribution system to create a low-resolution version of the electronic document. The calculation of the maximum resolution required for displaying each image on a low-resolution display screen, annotation of the markup language file, and creation of the low-resolution version of the electronic document are all done without requiring the author to provide different resolutions for each image. The author just provides images at best (or at any) resolution available and the system for authoring, publishing, and distribution of electronic documents automatically generates multiple versions of the electronic document. In addition, creating the low-version of the electronic document by the thinning tool in the content distribution system eliminates the need to create two versions of the document at authoring and publication time.

Some embodiments categorize display capabilities of user devices into two groups of devices with high-resolution capabilities and devices with low-resolution capabilities. These embodiments use a resolution threshold to categorize the display capabilities. For instance newer versions of tablets with Retina® display capabilities may be categorized as devices with high-resolution capabilities while the older versions of tablet devices may be categorized as devices with low-resolution capabilities. Other devices are also categorized into one of the two groups based on their display resolutions. It will be realized by a person of ordinary skill in the art that the teaching of the invention can be readily used to categorize device display capabilities into more then two categorize (e.g., by using more than one resolution thresholds) and creating multiple versions of a document, each version with a particular resolution for a particular device resolution category.

A. Authoring And Publishing of High-Resolution Versions of Electronic Documents

Some embodiments provide a content authoring and publishing application (or document authoring application) that is utilized by a user to author and publish an electronic document such as an electronic book. An example of such an application is Apple iBooks Author® application. The content authoring and publishing application is utilized to create a high-resolution version of the electronic document. Examples of electronic documents include electronic books, electronic magazines, electronic newspapers, electronic articles, etc. An electronic book (ebook, e-book, digital book) is a book publication in digital form, which includes text, images, and other multimedia content. Electronic documents described herein are authored and published on computers or other electronic devices. These electronic documents are readable on computers or other electronic devices such as dedicated electronic book readers (e.g., Amazon Kindle® or similar devices), general-purpose computer tablets (e.g., Apple iPad® or similar devices), smart phones (e.g., Apple iPhone® or similar devices), etc.

Figure 2:
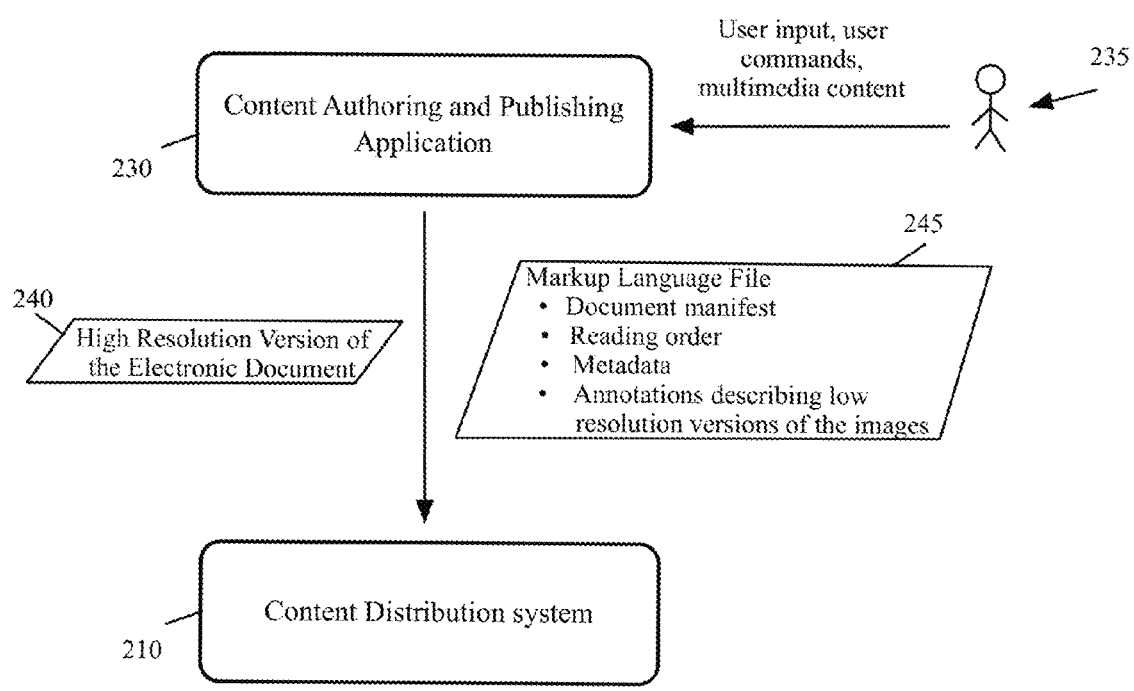
FIG. 2 conceptually illustrates a content authoring and publishing application in some embodiments of the invention.

FIG. 2 conceptually illustrates a content authoring and publishing application 230 in some embodiments of the invention. As shown, the content authoring and publishing application 230 receives input, commands, and different multimedia content from an author/user 235 and generates a high resolution version 240 of the electronic document as well as an associated file such as a markup language file 245. The markup language file includes a list (or manifest) of different components of the electronic document, the reading order for the document, and metadata for different content of the electronic document. An example of the markup language file is an open packaging format (OPF) file that includes XML instructions and provides a mechanism by which the various components of an electronic publication are tied together. The OPF file provides structure and semantics to the electronic publication. A person of ordinary skill in the art will realize that other file formats and other methods of listing the document content can be used instead of an OPF, an XML, or a markup language file.

The content authoring and publishing application 230 also includes additional annotations in the markup language file 245 to describe the maximum resolution required for displaying images on a user device with a low-resolution display screen. The authoring and publishing application 230, however, does not require the author of electronic document to provide low-resolution versions of the images nor does the application generate a low-resolution version of the electronic document. Once a document is authored and published (i.e., finalized) by the author, the document is uploaded to a content distribution system 210.

Figure 3:
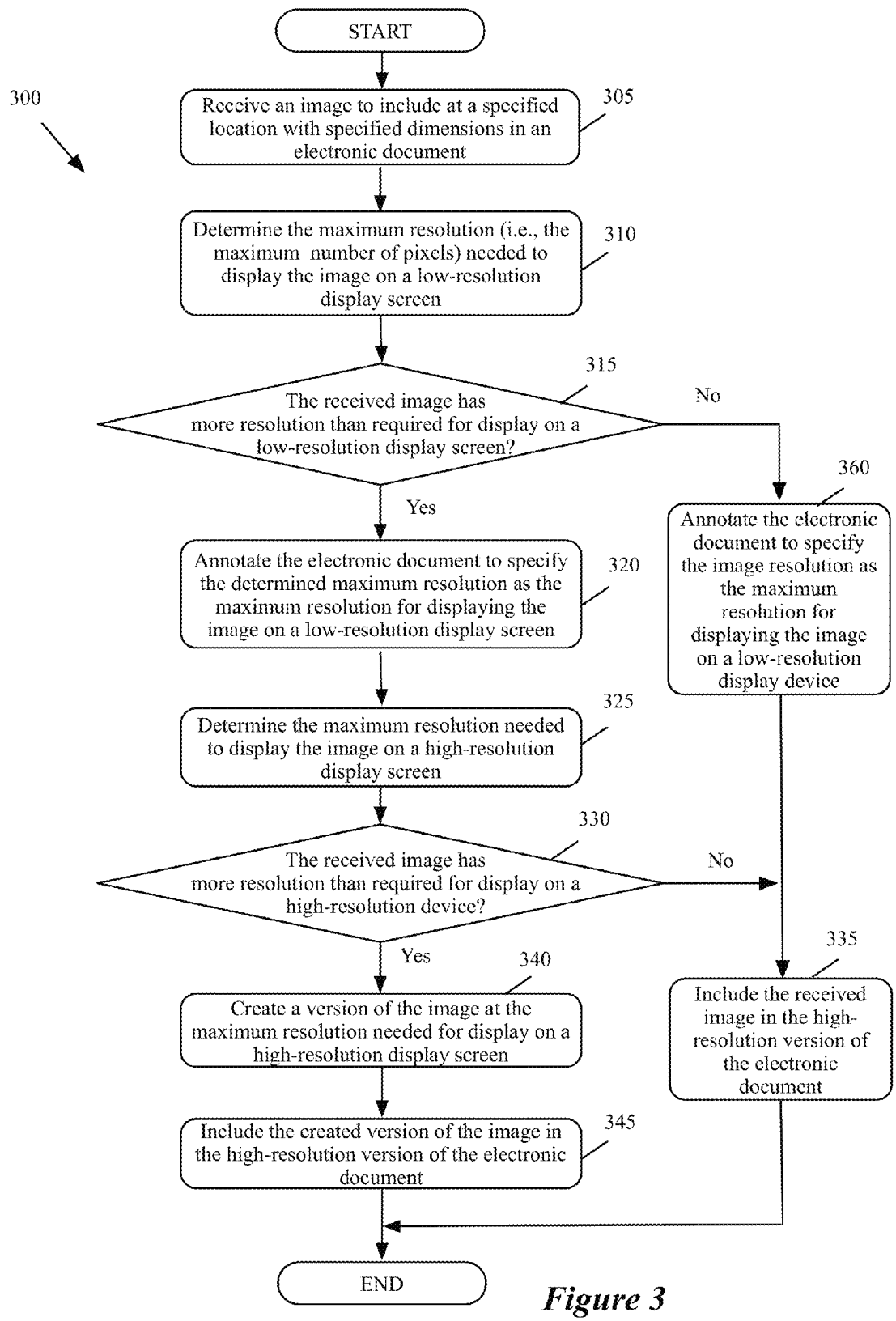
FIG. 3 conceptually illustrates a process for annotating a high-resolution electronic document to facilitate automatic creation of a low-resolution version of the electronic document in some embodiments of the invention.
Figure 4:
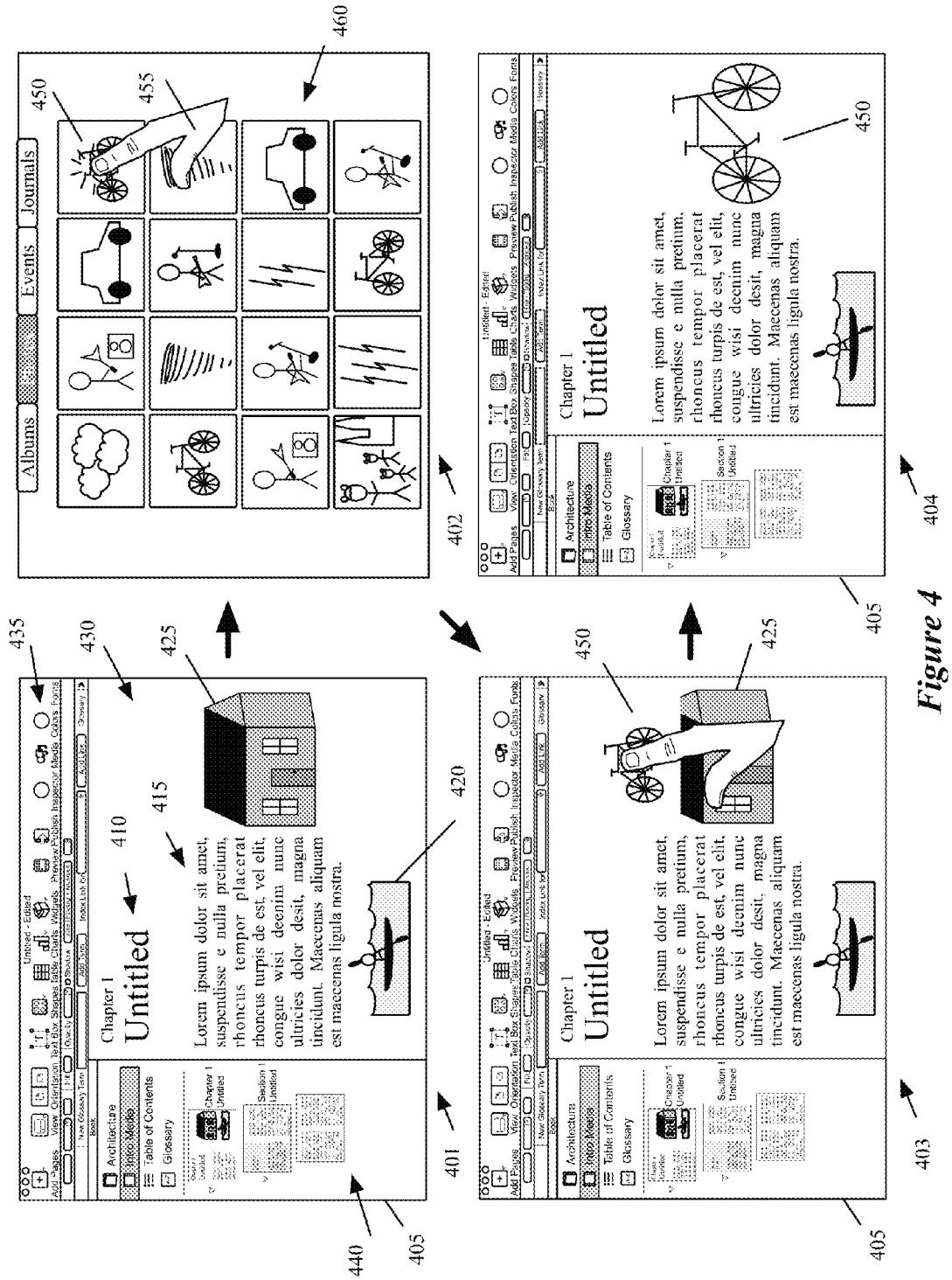
FIG. 4 illustrates a user interface of a content authoring and publication application of some embodiments where an image is added to an electronic document.

FIG. 3 conceptually illustrates a process 300 for annotating a high-resolution electronic document to facilitate automatic creation of a low-resolution version of the electronic document in some embodiments of the invention. Process 300 in some embodiments is performed by a content authoring and publishing application 230 as shown in FIG. 2. FIG. 3 is described by reference to FIGS. 4-6. As shown in FIG. 3, process 300 receives (at 305) an image to include at a specified location with specified dimensions in an electronic document. FIG. 4 illustrates a user interface 405 of a content authoring and publication application of some embodiments where an image is added to an electronic document. FIG. 4 is shown in four stages 401-404. The application in some embodiments provides a set of templates in order to facilitate creating of an electronic document.

As shown in stage 401, a template 430 is selected and is displayed on the user interface 405. The template 430 provides several placeholders 410-425 for text and multimedia content. The user/author using the application can type text or can select and move (e.g., by a drag and drop operation) different multimedia assets to replace the placeholder items 410-425. The content to include in the electronic document includes text, images, and/or small applications (also referred to as widgets). These small applications or widgets are utilized to include media (such as movie or audio files that the users/readers of the published document can play), interactive images (that the users/readers can pan and/or zoom to provide detailed information about specific parts of a graphic), presentations (such as PowerPoint® or Keynote® presentations), reviews (a sequence of multiple-choice or drag-to-target questions), image galleries that include sequences of images that the users/readers can swipe through, etc.

The user interface 405 also provides a toolbar 435 and a sidebar 440. The toolbar 435 provides access to the tools and controls needed for creating an electronic document. The sidebar 440 is an area along a side of the user interface 405 where the thumbnail images of the chapters, sections, and pages of the electronic document are shown. In this example, the sidebar 440 is used to display a pane where chapters and sections of the electronic document can be added, deleted, or rearranged.

As shown in stage 402, the user has selected (as conceptually shown by the hand gesture 455) an image 450 to include in the electronic document. In this example, the user has selected the photo from a collection of photos 460, which are either provided by the authoring and publishing tool or are selected from the user device storage.

The author user can either type text (e.g., to replace the Latin placeholder text 415) or move different content into placeholder areas as well as resizing and rearranging the content on a document page. In stage 403 the selected image 450 is moved into template 430 to replace the placeholder image 425. In stage 404, the selected image 450 has replaced the placeholder image 425. As shown, the image 450 is optionally resized and/or cropped to cover the same area as the placeholder image. In other embodiments, or based on other settings for the user interface, the selected image is not resized. In either case, after placing the image on the page, the user/author can move and/or resize the objects that are placed on a document page.

Referring back to FIG. 3, process 300 determines (at 310) the maximum resolution needed to display the received image on a low-resolution display screen. The maximum resolution needed is determined based on several different criteria. In some embodiments, some of the images that are included in an electronic document can be resized when the document is being read by user/reader (i.e., an end user who has downloaded the electronic document to his/her user device). Other images occupy a fix area on a page and cannot be resized. Process 300, therefore, considers the maximum size that an image can occupy on a display screen (when the document is being read by an end user) as well as the resolution of the user device display screen in order to determine the maximum resolution needed to display an image on a display screen with a certain resolution.

Figure 5:
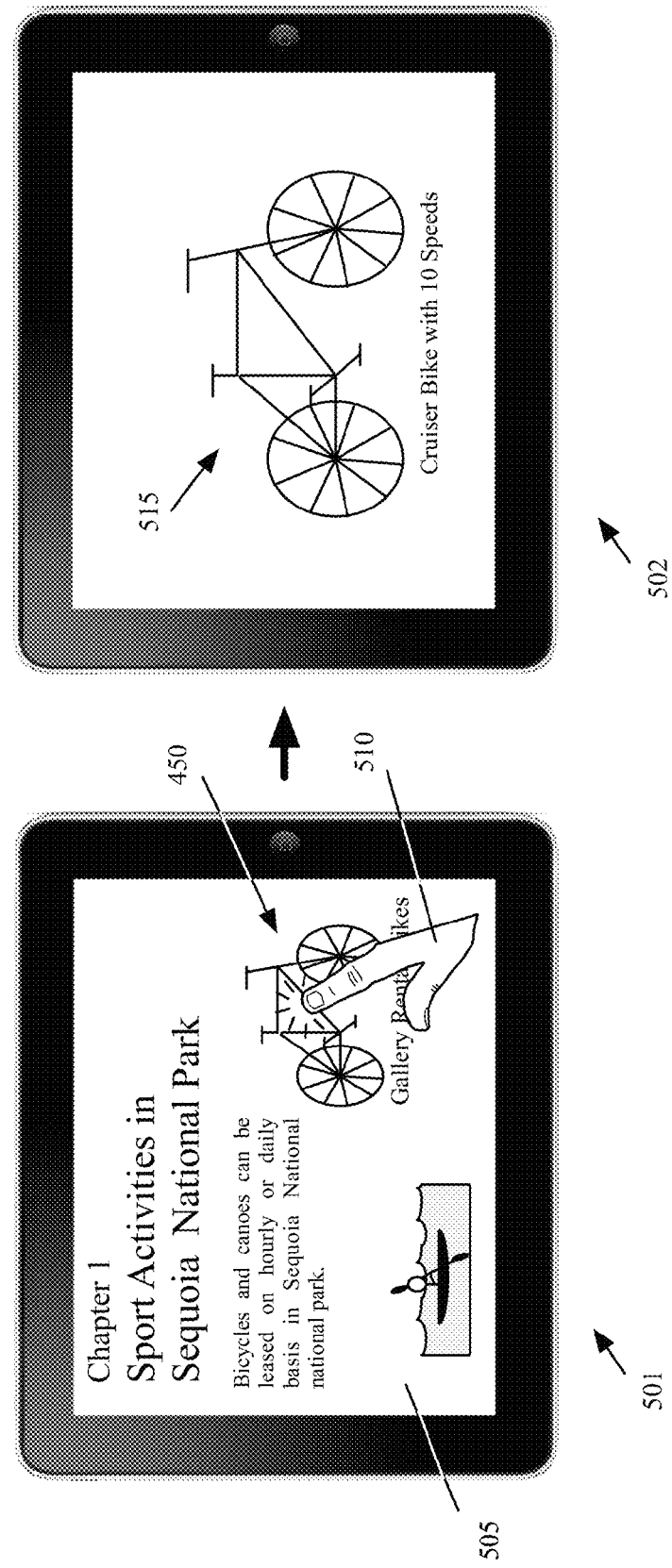
FIG. 5 illustrates a user interface of a digital content viewing application that is used to enlarge an image in some embodiments of the invention.

FIG. 5 illustrates a user interface 505 of a digital content viewing application (such as the digital content viewing application 998 shown in FIG. 9, described below) that is used to enlarge an image in some embodiments of the invention. FIG. 5 is shown in two stages 501 and 502.

Stage 501 shows the published version of the document page shown in FIG. 4 after all placeholders 410-425 are replaced by the actual content for the electronic document. As shown, the user (e.g., the user of one devices 920-925 in FIG. 9 who has downloaded the published version of the electronic document and is reading the document) has selected image 450 (e.g., by tapping on the image with a finger as conceptually shown by the hand gesture 510 or by selecting the image by a cursor selection tool such as a mouse).

Stage 502 shows that, after the selection by the user, the image 450 has been rescaled to occupy the whole page (i.e., the image is rescaled to full screen size). The resized image 515 occupies more space and requires more pixels in order to be displayed with the same resolution as image 450. In some embodiments, image 515 is one of the images in a gallery of images associated with image 450. Once image 450 is selected, the user can see other images in the gallery by, for example, swiping through the sequence of images.

Figure 6:
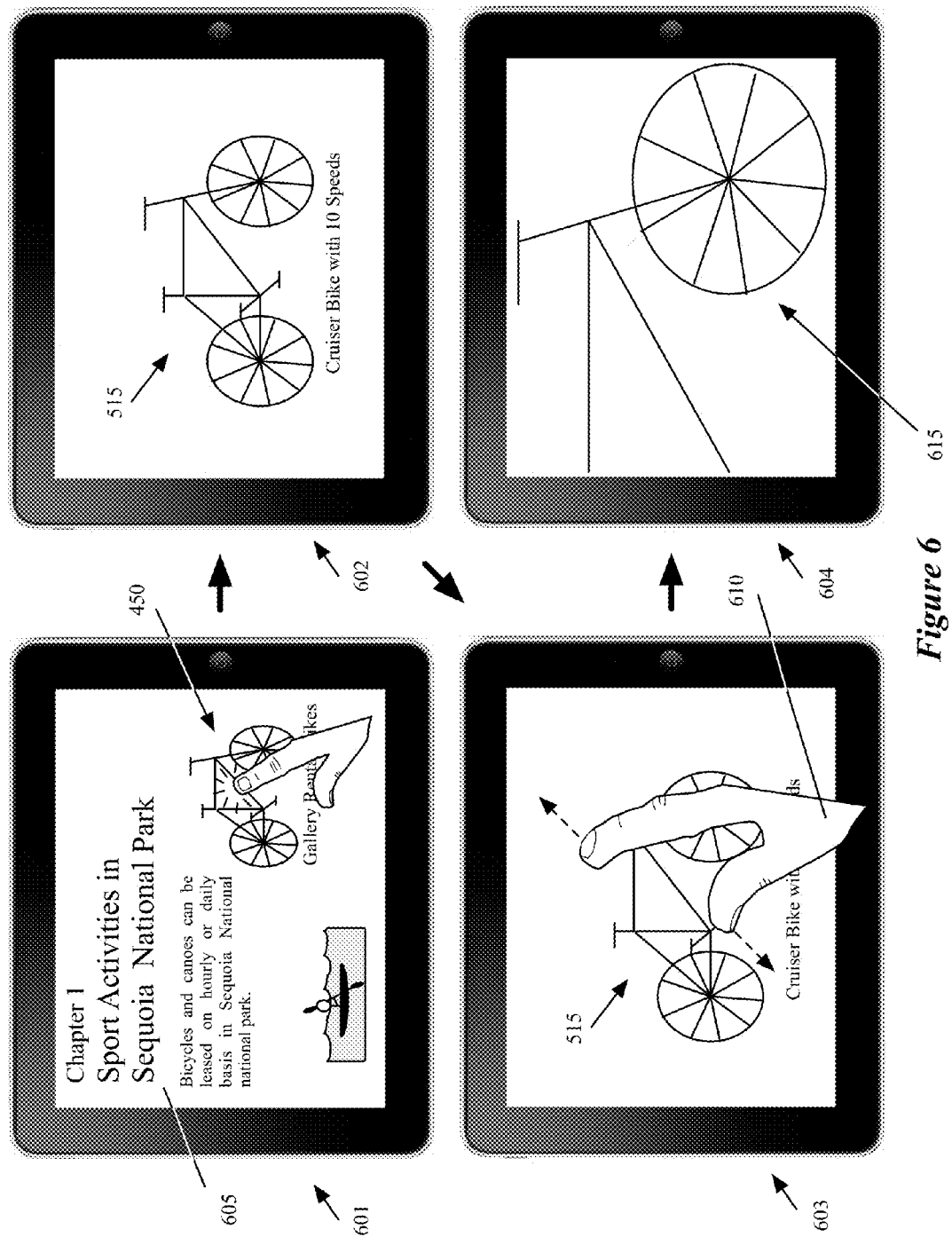
FIG. 6 illustrates a user interface of a digital content viewing application that is used to zoom a portion of an image in some embodiments of the invention.

In some embodiments, an image can also be zoomed such that a portion of the image is shown on the display screen with a larger size. FIG. 6 illustrates a user interface 605 of a digital content viewing application (such as the digital content viewing application 970 shown in FIG. 9, described below) that is used to zoom a portion of an image in some embodiments of the invention. FIG. 6 is shown in four stages 601-604. Stages 601 and 602 are similar to stages 501 and 502 of FIG. 5, respectively. In these stages, the user has selected the image 450 and the image 515 has resized to occupy the full screen in stage 602.

In stage 603, the user has zoomed in (e.g., by pinching out as conceptually shown by the hand gesture 610) a portion of the image. In stage 604, a portion 615 of the image is enlarged to occupy the full screen. FIGS. 5 and 6 show some examples of resizing and zooming of an image. The zoomed image 615 shows a smaller portion of the image on a larger portion of the display screen and therefore requires more pixels in order to display the enlarged portion 615 with the same resolution as image 450. In some embodiments, an image can be enlarged or rescaled to occupy a larger portion of the image without covering the full screen.

Referring back to operation 310 in FIG. 3, process 300 uses the type of the image (i.e., whether the image is fixed size or can be rescaled and/or zoomed) as well as the resolution of the display screen of the user device that is used to read the published document to determine the maximum number of pixels needed to display the image on a low-resolution display screen.

The process then determines (at 315) whether the received image (e.g., the image 450 provided by the author in FIG. 4) has more resolution (i.e., more pixels) than required for display on a low-resolution display screen. If not, the process proceeds to 360, which is described below. Otherwise, the process annotates (at 320) the electronic document (i.e., the markup language file associated with the electronic document) to specify the determined maximum resolution as the maximum resolution needed to display the image on a low-resolution display screen. Examples of annotating the markup language file are given further below.

The process then determines (at 325) the maximum resolution (i.e., the maximum number of pixels) needed to display the image on a high-resolution display screen. The process utilizes a similar technique as described by reference to operation 310 to determine the maximum resolution needed to display the image on a high-resolution display screen (i.e., by considering whether the image is fixed sized, or can be scaled and/or zoomed as well considering the resolution of a high-resolution display screen of a user device used to read the published document).

The process then determines (at 330) whether the received image has more resolution than required for displaying the image on a high-resolution device. If not, the process includes (at 335) the received image in the high-resolution version of the electronic document. The process then end.

Otherwise, the process creates (at 340) a version of the image at the maximum resolution needed for displaying the image on a high-resolution display screen (e.g., by down sampling the received image). The process then includes (at 345) the down sampled version of the image in the high-resolution version of the electronic document. The process then ends.

When the process determines (at 315) that the received image does not have more resolution than required for display on a low-resolution display screen, the process optionally annotates (at 360) the electronic document (i.e., the markup language file associated with the electronic document) to specify the resolution of the image (as received from the author) as the maximum resolution needed to display the image on a low-resolution display screen. The process then proceeds to 335, which was described above. In some embodiments, when the image included in the electronic document does not have more resolution than required to display on a low-resolution display screen, process 300 does not add any extra annotations to the markup language file (which is an indication that the low-resolution version of the electronic document has to use the same image resolution as the high-resolution version).

The following is an example of the description provided for an image in a markup language file in some embodiments.

<item id="di3" href="assets/images/87974949a.jpg" media-type="image/jpeg" ibooks:width-1x="264" ibooks:height-1x="348"/>

The first portion of the description identifies the item identifier of the image as "di3," provides the relative address of the file containing the image (e.g., relative to the address of the markup language file that contains the item description), and identifies the media type of the item as a jpeg image. The image description, however, has additional annotation that is included by the content authoring and publishing application, which identifies the number of pixels required for a low-resolution version of the image. As shown, the maximum number of pixels required for the low-version of the image is 264 pixels for the image width and 348 pixels for the image height.

The following is another example of the description provided for an image in a markup language file in some embodiments. In this example, the image is a gallery image, which is a part of a sequence of images that can individually be scaled to the full size of the display screen.

<item id="di12" href="assets/images/IMG_0951-1.jpg" media-type="image/jpeg" ibooks:width-1x="1024" ibooks:height-1x="765" ibooks:original-width="2048" ibooks:original-height="1530"/>

The first portion of the description identifies the item identifier of the image as "di12," provides the relative address of the file containing the image (e.g., relative to the address of the markup language file that contains the item description), and identifies the media type of the item as a jpeg image. The image description, however, has additional annotation that is included by the content authoring and publishing application, which identifies the number of pixels required for a low-resolution version of the image. As shown, the maximum number of pixels required for the low-version of the image is 1024 pixels for the image width and 765 pixels for the image height.

In addition, the annotations also describe the original width and the original height of the high-resolution image. Since the original image does not exist in the low-resolution version of the document (the original version of the image is replaced by a low-resolution version of the image), the original width and the original height annotations provide the ratio of the original image and allows the image to be correctly cropped when the image is enlarged to cover the full screen and then is resized to cover the area allocated for the image on the page. The image in this example covers a portion of a document page along with other page content (such as image 450 in FIG. 5) when the image is not enlarged and covers the full screen (such as image 515 in FIG. 5) when the image is enlarged.

As an example, when a portrait image is enlarged to be viewed as a landscape image gallery image (i.e., when the image is enlarged to cover the full screen and is viewed in landscape orientation), the image in some embodiments is fit on the screen at width and the top and the bottom of the image are cropped in order to fit the image on the screen. Once the image is scaled back from covering the full screen to covering the area allocated to the image on the page, the original width and the original height annotations provide the correct ratio for displaying the image after the image is resized.

Figure 7:
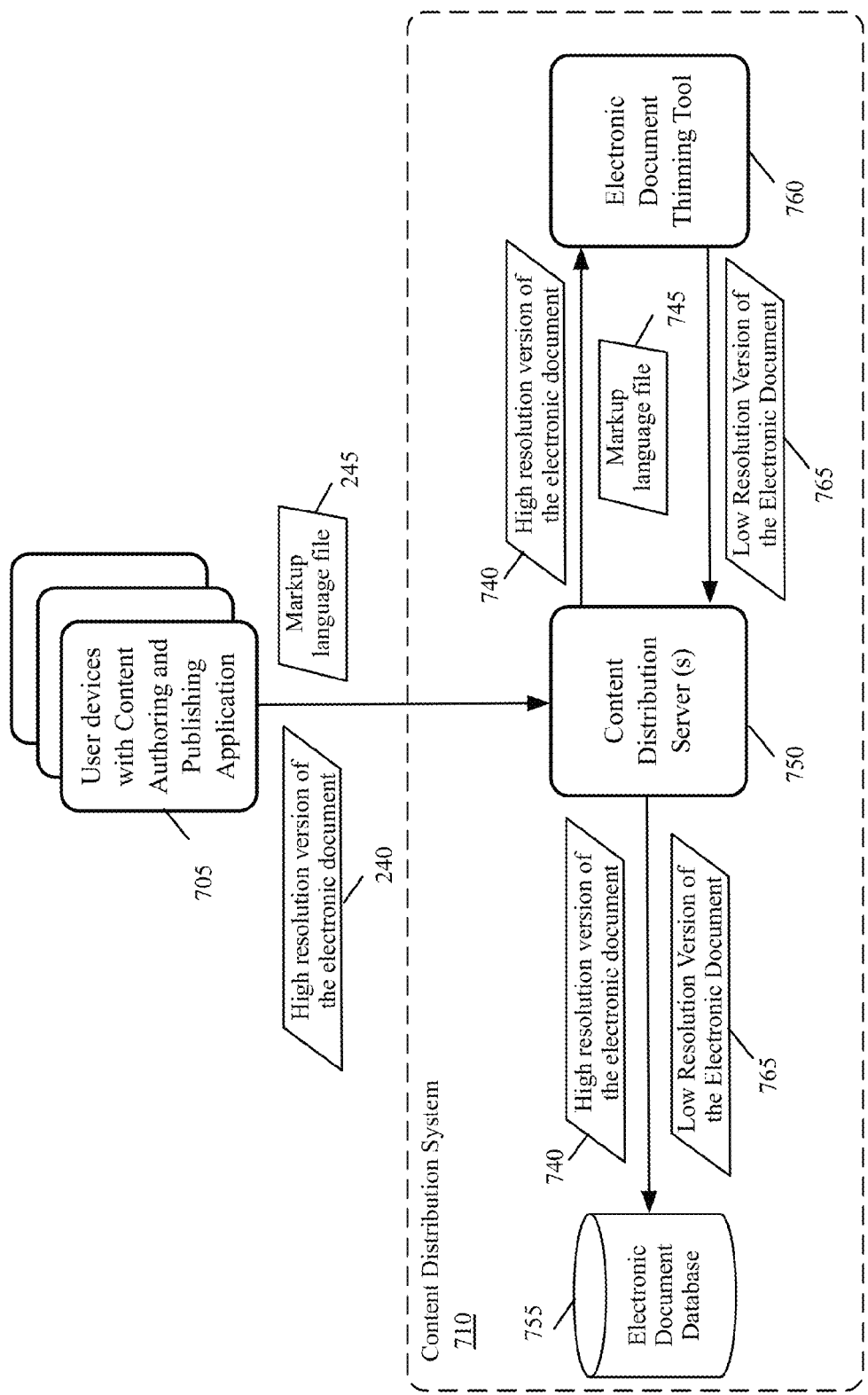
FIG. 7 conceptually illustrates a content distribution system in some embodiments of the invention.

B. Automatically Generating a Low-Resolution Version of an Electronic Document by using Annotations Associated with a High-Resolution Version of the Electronic Document Once a document is authored and published (i.e., finalized) by the author, the content authoring and publishing application uploads the document to a content distribution system. FIG. 7 conceptually illustrates a content distribution system 710 in some embodiments of the invention. The content distribution system 710 includes one or more content distribution servers 750 that receive the published high-resolution documents 240 from user devices 705 with content authoring and publishing applications and store them in one or more databases 755. An example of a content distribution system is Apple iTunes® Store.

In addition to the high-resolution version of the electronic documents 240 that are received from user devices 705, the content distribution system 710 crates a low-resolution version of each document by utilizing an electronic document thinning tool 760. The low-resolution versions of the documents are used for display on devices with low-resolution display screens. Using a high-resolution document on a user device that does not have a high-resolution display amounts to wasting of storage space and slowing the loading and displaying of images on the user device while the user cannot experience the high-resolution images on a low-resolution display screen.

The electronic document thinning tool 760 uses the high-resolution version of the electronic document 240 and the annotations added by the content authoring and publishing application 730 to the markup language file 245 and generates a low-resolution version 765 of the electronic document. Utilizing the electronic document thinning tool 760 eliminates the need to require the authors 735 to provide two different resolutions of the image assets for publishing their electronic documents. The content distribution systems 710 hosts two versions of each electronic document by storing the high-resolution and the low-resolution versions of each electronic document in the electronic document database 755.

In some embodiments, the low-resolution version of the document is generated by using the same content as the high-resolution version, except for replacing the high-resolution images with low-resolution images. Since the content authoring and publishing application (as described by reference to FIG. 3) only generates a high-resolution version of the electronic document, the electronic document thinning tool utilizes the annotations associated with each high-resolution image to generate a low-resolution version of the image (unless the image is already in low-resolution, e.g., as determined by operation 315 in FIG. 3). The low-resolution image is then used for the low-resolution version of the document instead of the high-resolution version of the image.

Figure 8:
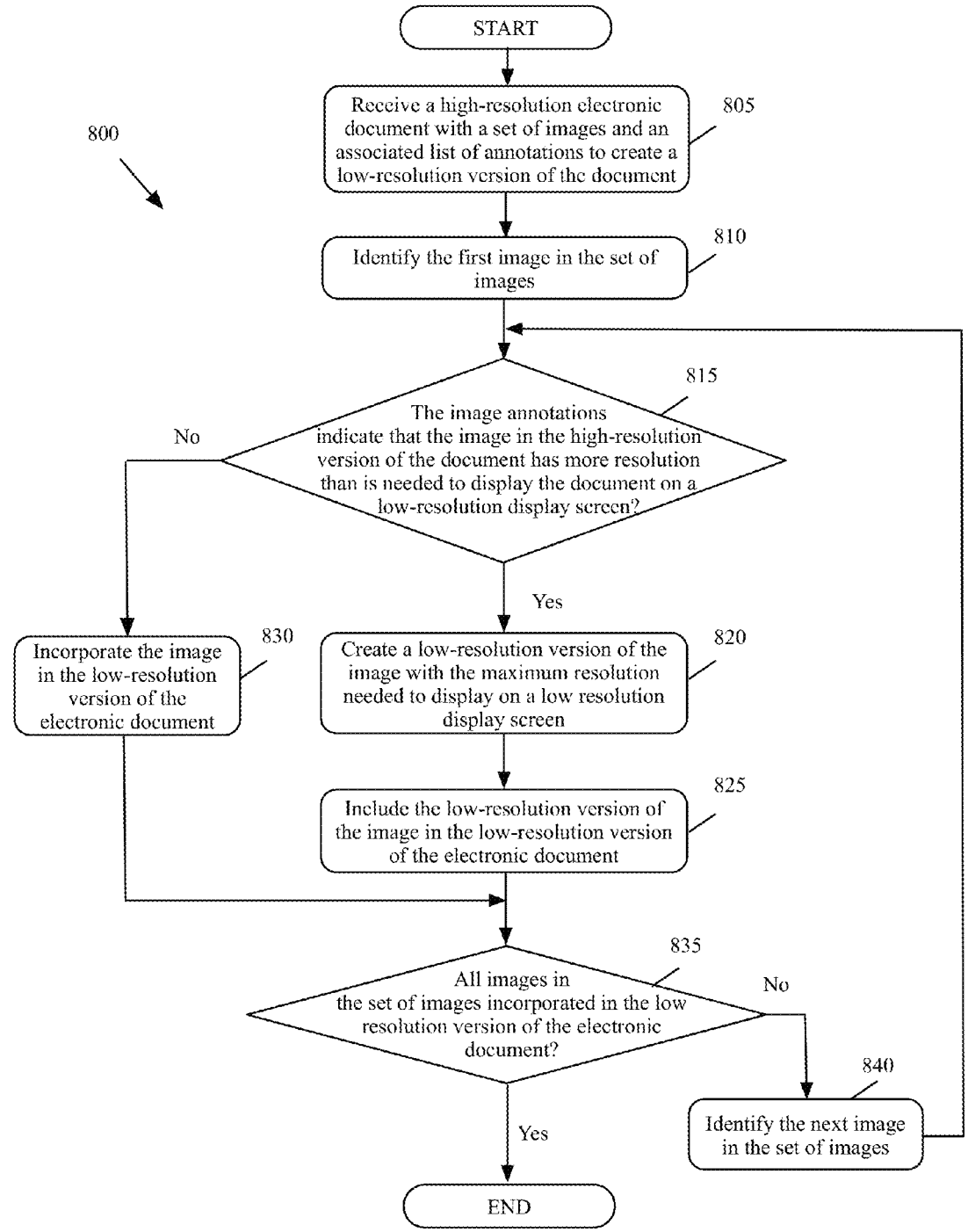
FIG. 8 conceptually illustrates a process for automatically creating a low-resolution version of an electronic document by using a high-resolution version of the document and a set of annotations added to a markup language file associated with the document.

FIG. 8 conceptually illustrates a process 800 for automatically creating a low-resolution version of an electronic document by using a high-resolution version of the document and a set of annotations added to a markup language file associated with the document. Process 800 in some embodiments is performed by electronic document thinning tool 760 of the content distribution system 710 shown in FIG. 7. The same markup language file that is used to read the high-resolution is used to create the low-resolution version of the electronic document. The same markup language file is also used in some embodiments to read the low-resolution version of the document once the low-resolution version is created and downloaded to user devices.

As shown in FIG. 8, the process receives (at 805) a high-resolution version of the electronic document with the associated markup language file. For instance, the process receives a high-resolution version 240 of the electronic document and the associated markup language file 245 at the electronic document thinning tool 760 as shown in FIG. 7. As described in the previous section, the high-resolution version of the document has a set of high-resolution images. The description of these images in the markup language file has additional annotations that identify a maximum resolution for the low-resolution versions of the images.

The process then identifies (at 810) the first image in the set of images. For instance, the process examines the markup language file to find annotations for the first image in the reading order. The process then determines (at 815) whether the annotations for the image indicate that the identified image has more resolution than is needed to display the image on a low-resolution display screen. As described above, some embodiments annotate the description of the image in the markup language file to indicate the number of pixels that are required for the low-version of the documents. In other embodiments, when the image in the high-resolution version of the document does not have more resolution than required for display on a low-resolution display screen, no extra annotations are added to the description of the image.

When the image in the high-resolution version of the document does not have more resolution than required for display on a low-resolution display screen, the process incorporates (at 830) the image in the low-resolution version of the electronic document. The process then proceeds to 835, which is described below. Otherwise, the process creates (at 820) a low-resolution version of the image with the maximum resolution based on the image annotations in the markup language file (e.g., by down sampling the image included in the high-resolution version of the document).

The process then includes (at 825) the low-resolution version of the image in the low-resolution version of the electronic document. The process then determines (at 835) whether all images in the set of images are incorporated in the low-resolution version of the electronic document. If yes, the process ends. Otherwise, the process identifies (at 840) the next image in the set of images. The process then proceeds to 815, which was described above.

II. Providing the Appropriate Version of a Document to Different User Devices Based on Display Capabilities of Each User Device Once the low-resolution version of the electronic document is generated by the electronic document thinning tool, the content distribution system hosts both versions of the document and negotiates with user devices that request to access the document to provide the appropriate version of the document to each user device based on the display capability of the device.

Figure 9:
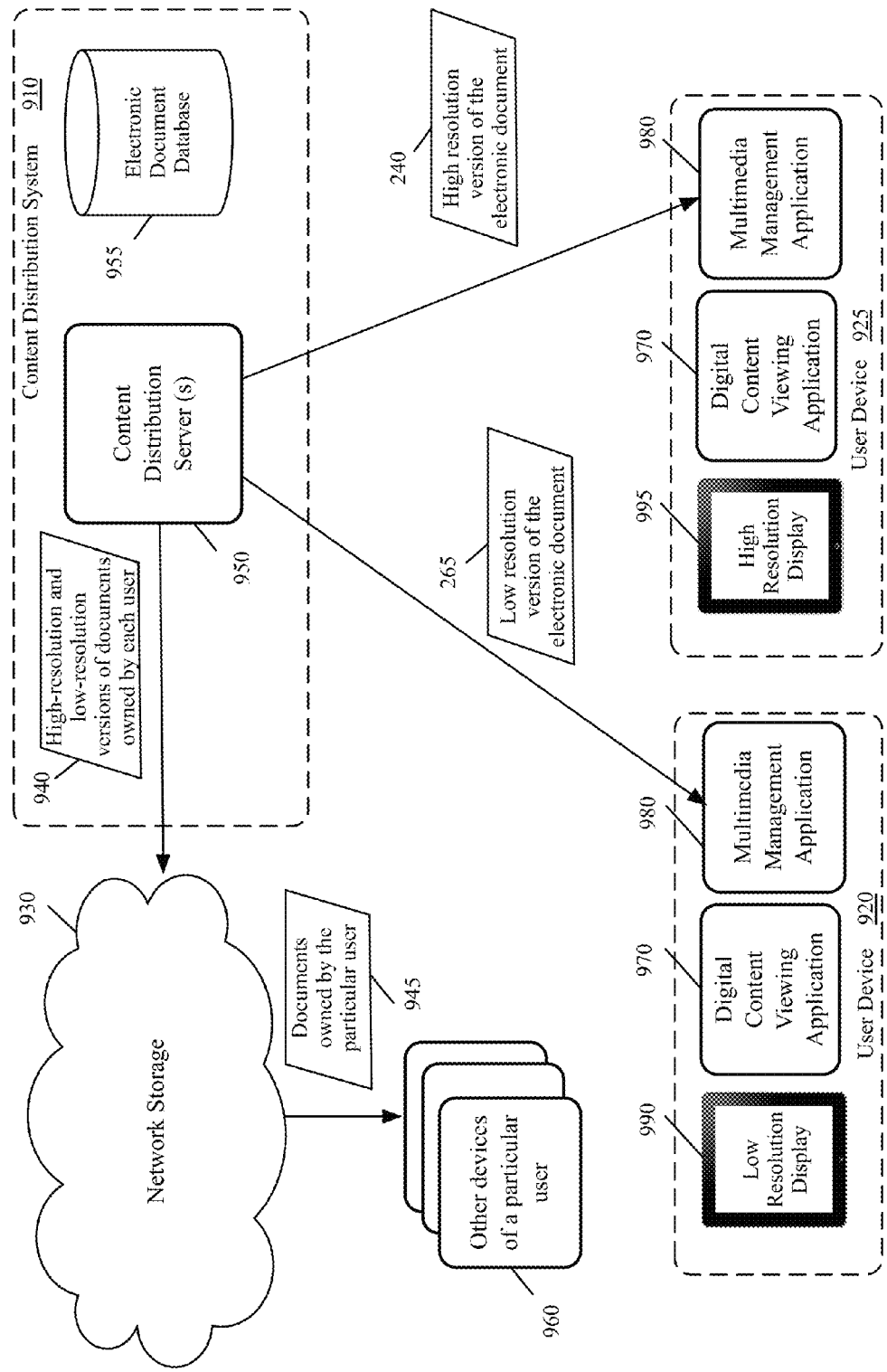
FIG. 9 conceptually illustrates a system for providing documents to user devices based on the devices display capabilities in some embodiments of the invention.

FIG. 9 conceptually illustrates a system for providing documents to user devices based on the devices display capabilities in some embodiments of the invention. User devices 920-925 send requests to access the electronic document. The user devices also provide their display capabilities. Depending on these capabilities the content distribution servers provide the high-resolution or the low-resolution versions of the electronic document to each user devices.

The multimedia management application 980 of each user device negotiates with the content distribution system 910 about which version of the book to download and provides the documents to digital content viewing application 970 of the device. As shown, the low-resolution version 265 of the electronic document is sent to user devices 920 that include a low-resolution display screen 990 and the high-resolution version 240 of the electronic document is sent to user devices 925 that include a high-resolution display screen 995.

In some embodiments, the content distribution system allows a user device that gains access to an electronic document (e.g., by purchasing and downloading the document) to distribute the document to a limited number of other electronic devices associated with the user device. As an example, when a user purchases an ebook, the user is allowed to read the ebook on the user's computer as well as on user's other electronic devices such as tablets, touchpads, ebook readers, and smartphones.

As shown, some embodiments store both high-resolution and low-resolution versions of documents 940 owned by users on a network storage 930 for distribution to other devices of the same users. An example of such network storage is Apple iCloud®. When other devices 960 of a user that is authorized to access an electronic document are connected to the network storage (e.g., by logging in to a web site associated with the network storage), the appropriate version of the document 945 is sent to each one of the authorized user's devices: a high-resolution version of the document is sent to the user's devices that have high-resolution displays and a low-resolution version of the document is sent to user's devices that have low-resolution display.

In some embodiments, when a user device gains access to an electronic document (e.g., when the user of the device purchases an electronic book) through the content distribution system 910, the network storage 930 automatically pushes the electronic document to all other devices of that user (e.g., based on the user account identification and password).

In some embodiments, when a user reads an electronic document using the digital content viewing application 970, the digital content viewing application 970 provides tools for highlighting text, taking notes, or leaving bookmarks in the electronic document. The user is provided with the option to save all user edits such as the highlights, notes, and bookmarks back to the network storage 930. The network storage saves the user edits in both the high-resolution and low-resolution versions of the document. The user can download the edits to any of the user devices at any time.

As an example, a user purchases an electronic document such as an electronic book from the content distribution system 910 in some embodiments. The content distribution system 910 saves both versions of the document on the network storage 930. The user then downloads the book into a first user device such as a smartphone with low-resolution display to read the book. The network storage 930 downloads the low-resolution version of the document into the smartphone based on the resolution of the smartphone display. The user then reads the electronic book by using the digital content viewing application 970 on the smartphone and e.g., leaves a bookmark and highlights some paragraphs. The user then saves the book back to the network storage 930. The network storage 930 transparently updates the high-resolution version of the documents with the same bookmark and highlights. At a later time, the user uses a second user device such as a tablet with high-resolution display to continue reading the book. The network storage 930 downloads, based on the display resolution of the tablet, the high-resolution version of the book to the tablet with the same bookmark and the same highlighted paragraphs as the user left on the low-resolution version of the book. Updating both versions of the book and downloading of the appropriate version of the electronic book with the proper bookmarks, notes, highlights, etc., is done automatically and is transparent to the user.

In some other embodiments (not shown) the multimedia management application 980 of a user device can synchronize with multimedia management applications of the user's other devices to send the appropriate version of the document to other associated devices. An example of a multimedia management application 980 is Apple iTune® application. Each one of the user devices 920-925 and 960 includes a digital content viewing application 970 to read the electronic documents. In some embodiments, the functionality of multimedia management application is included in the digital content viewing application. An example of a digital content viewing application is Apple iBooks®.

Figure 10:
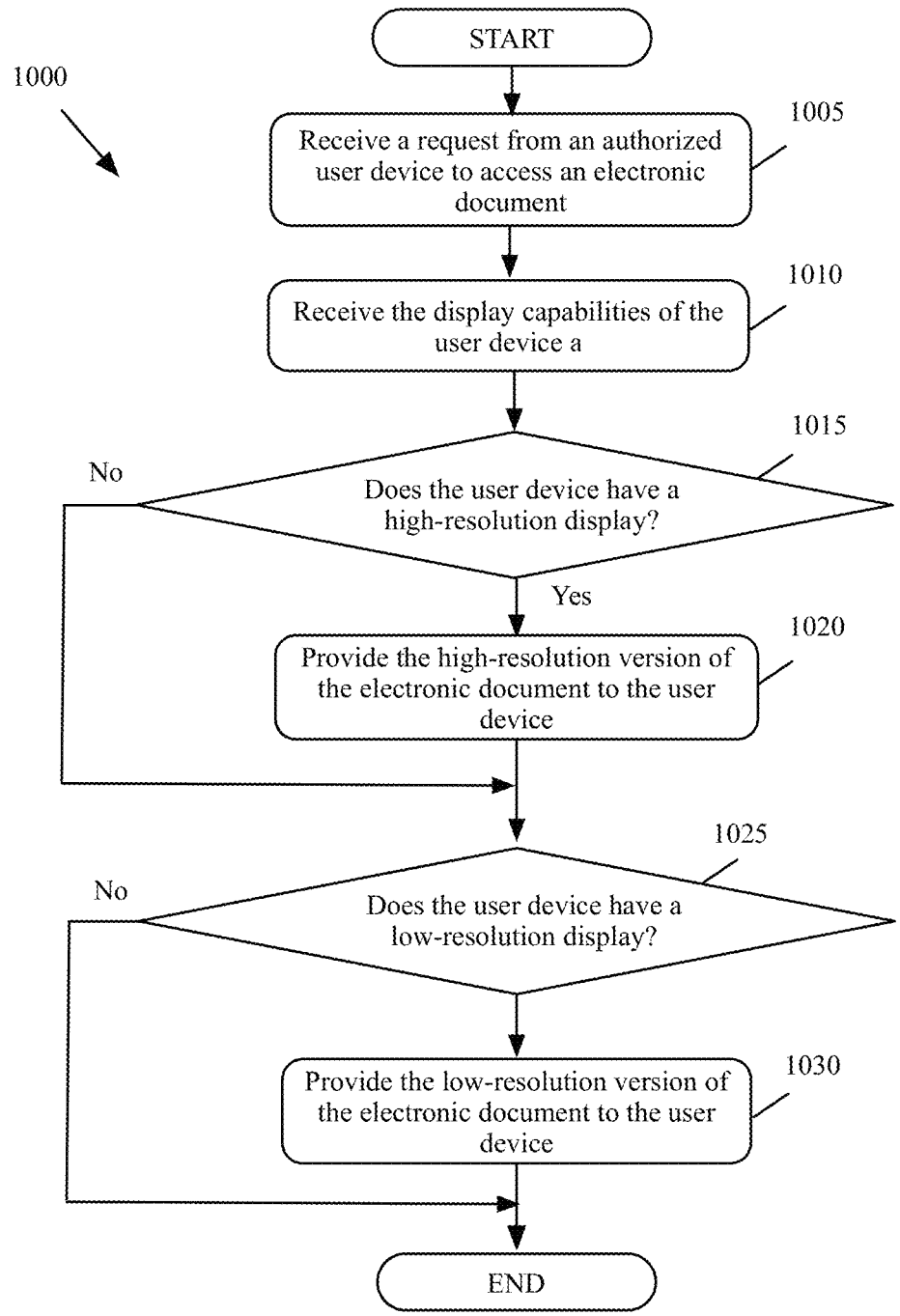
FIG. 10 conceptually illustrates a process for distributing an electronic document to a set of user devices in some embodiments of the invention.

FIG. 10 conceptually illustrates a process 1000 for distributing an electronic document to a set of user devices in some embodiments of the invention. Process 1000 in some embodiments is performed by a content distribution server 950 of the content distribution system 910 shown in FIG. 9. As shown in FIG. 10, process 1000 receives (at 1005) a request from an authorized user device to access (e.g., to download) an electronic document. The process also receives (at 1010), either separately or together with the request, the display capabilities of the user device.

The process then determines (at 1015) whether the user device has a high-resolution display. If not, the process proceeds to 1025, which is described below. Otherwise, the process provides (at 1020) the high-resolution version of the electronic document to the user device. For instance, the process sends or downloads the high-resolution version of the document to the user device.

The process determines (at 1025) whether the user device has a low-resolution display. If not, the process proceeds to 1040, which is described below. Otherwise, the process provides (at 1030) the low-resolution version of the electronic document to the user device. The process stores (at 1040) both the high-resolution and the low-resolution versions of the document in a network storage for distribution to other devices associated to the authorized user device (e.g., to other devices owned by the same user). The process then ends. Process 1000, therefore, provides a high-resolution version or a low-resolution version of the document to the user device based on the display capabilities of the user device.

In some embodiments, when a user has gained access to an electronic document (e.g., by purchasing the document), other devices of the user can connect to a network storage (such as network storage 930 shown in FIG. 9) to download the appropriate version of the document based on the devices display capabilities. In these embodiments, a process similar to process 1000 is used to provide the appropriate version of a document to each user device.

Figure 11:
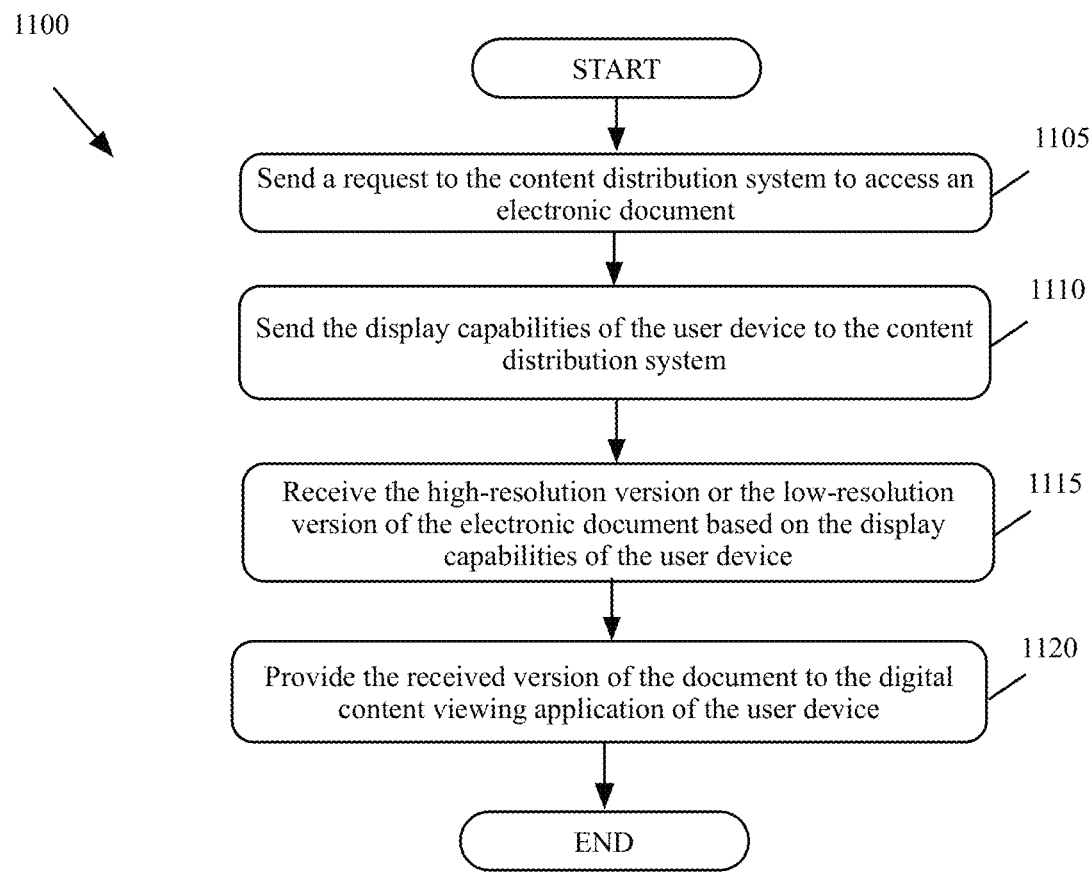
FIG. 11 conceptually illustrates a process for managing and sending the correct version of an electronic document to different user devices in some embodiments of the invention.

FIG. 11 conceptually illustrates a process 1100 for receiving and managing the correct version of an electronic document at a user device in some embodiments of the invention. Process 1100 in some embodiments is performed by multimedia management application 980 of a user device 920-925 shown in FIG. 9. As shown in FIG. 11, the process sends (at 1105) a request to the content distribution system to access an electronic document. For instance, the process sends a request to purchase and/or download the electronic document. The process also sends (at 1110), either separately or together with the request, the display capabilities of the user device to the content distribution system.

The process then receives (at 1115) the high-resolution version or the low-resolution version of the electronic document based on the display capabilities of the user device. The process also provides (at 1120) the received version of the document to digital content viewing application of the user device. The process then ends. Process 1100, therefore, receives either the high-resolution version or the low-resolution version of the document based on the display capabilities of the device. In some embodiments, when a user has gained access to an electronic document (e.g., by purchasing the document), other devices of the user can connect to a network storage (such as network storage 930 shown in FIG. 9) to download the appropriate version of the document based on the devices display capabilities. In these embodiments, a process similar to process 1100 is used to receive the appropriate version of a document at each user device.

III. Software Architecture

A. Content Authoring and Publishing Application

Figure 12:
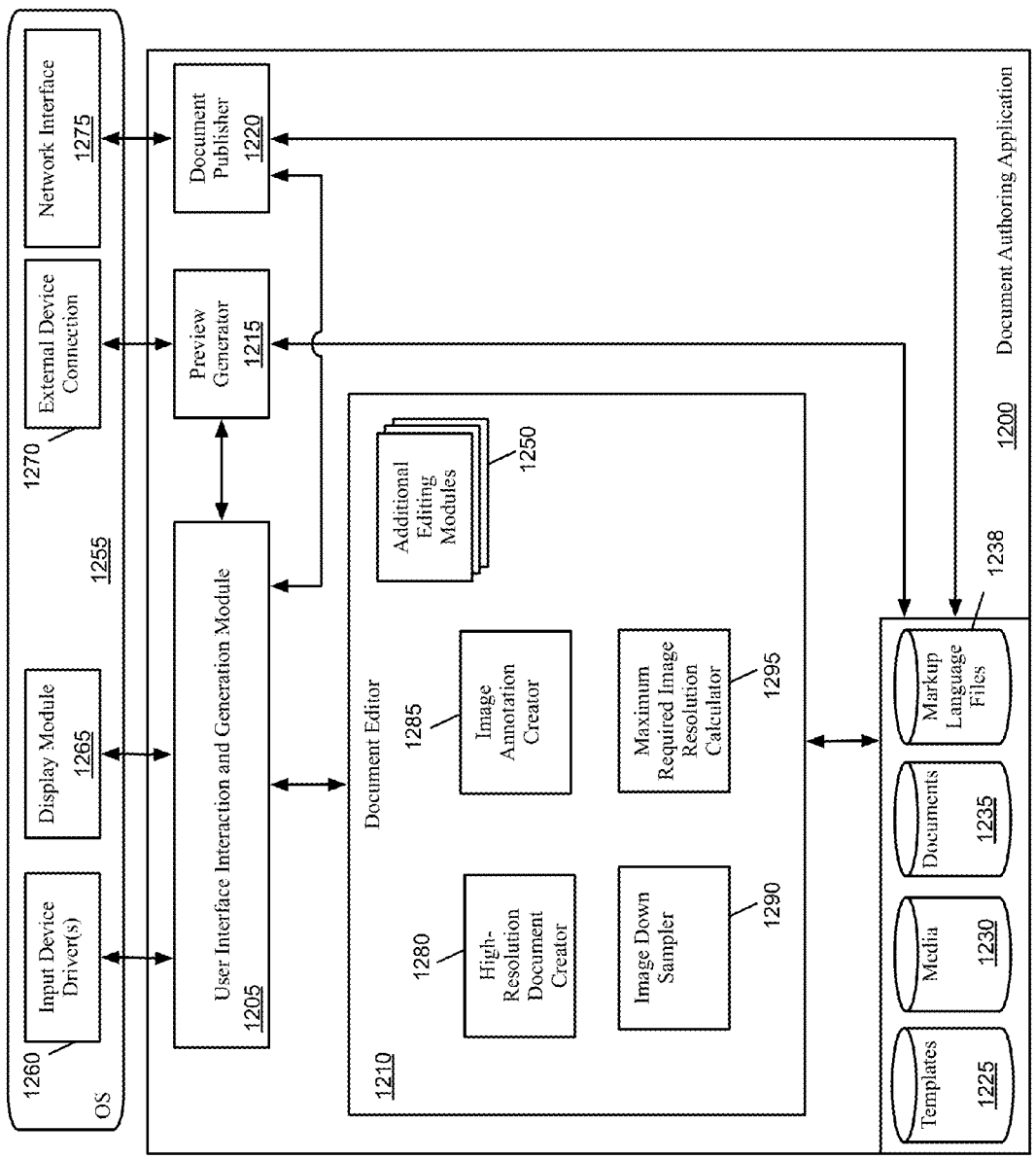
FIG. 12 conceptually illustrates the software architecture of a content authoring and publishing application of some embodiments.

In some embodiments, the content authoring and publishing processes described above are implemented as software running on a particular machine, such as a computer or a handheld device, or stored in a machine-readable medium. FIG. 12 conceptually illustrates the software architecture of a content authoring and publishing application 1200 of some embodiments. In some embodiments, the content authoring and publishing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The content authoring and publishing application 1200 includes a user interface (UI) interaction and generation module 1205, a document editor 1210, a preview generator 1215, and a document publisher 1220. The figure also illustrates stored data associated with the content authoring and publishing application, including templates 1225, media 1230, documents 1235, and markup language files 1238.

In some embodiments, the templates data 1225 stores template files that define different types of documents a user can create with the content authoring and publishing application 1200. The media data 1230 stores various types of media files (e.g., video files, audio files, combined video and audio files, etc.) imported into the application. The documents data 1235 of some embodiments stores user-created documents, which may incorporate or refer to media 1230, templates 1225, and markup language files 1238. In some embodiments, the documents 1235 are stored by the application as hierarchical structures (e.g., organized into chapters, sections, etc.). Some embodiments store information related to documents such as document manifest, metadata, reading order, and addition annotations to create low-resolution version of images from high-resolution versions in markup language files 1238.

In some embodiments, the four sets of data 1225-1238 are stored in one physical storage (e.g., an internal hard drive, external hard drive, etc.). In some embodiments, the data may be split between multiple physical storages. For instance, the template files 1225 and media files 1230 might be stored in one physical storage, while the user-created documents and associated markup language files are stored in a separate physical storage.

FIG. 12 also illustrates an operating system 1255 that includes input device driver(s) 1260, display module 1265, external device connection 1270, and network interface 1275. In some embodiments, as illustrated, the device drivers 1260, display module 1265, external device connection 1270, and network interface 1275 are part of the operating system even when the content authoring and publishing application 1200 is an application separate from the operating system.

The input device drivers 1260 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 1205.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface are also controlled or manipulated through other controls, such as touch control. In some embodiments, touch control is implemented through an input device that detects the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 1265 translates the output of a user interface for a display device. That is, the display module 1265 receives signals (e.g., from the UI interaction and generation module 1205) describing what should be displayed and translates these signals into pixel information that is sent to the display device. The display device may be an LCD, plasma screen, CRT monitor, touchscreen, etc.

The external device connection 1270, in some embodiments, allows for an external device to connect (either via a wired (e.g., USB, Firewire) connection or a wireless (e.g., Bluetooth®, WiFi) connection) to the machine on which the operating system 1255 and content authoring and publishing application 1200 run. Examples of such external devices may include smart phones (e.g., an iPhone), specialized electronic book readers, or more generic touchpads and tablets (e.g., an iPad) that include electronic book reader functionality.

The network interface 1275 represents one or more connections to various types of networks, through which the content authoring and publishing application 1200 may upload published documents (e.g., to a content distribution system). These network connections may include WiFi or other wireless connections, Ethernet or other wired connections, etc.

The UI interaction and generation module 1205 of the content authoring and publishing application 1200 interprets the user input data received from the input device drivers and passes it to various modules, including the document editor 1210 and its various component modules, the preview generator 1215, and the document publisher 1220. The UI interaction module also manages the display of the content authoring and publishing application GUI, and outputs this display information to the display module 1265. This UI display information may be based on information from the document editor 1210, the document publisher 1220, etc. In addition, the module 1205 may generate portions of the UI based solely on user input—e.g., when a user moves an item in the UI that only affects the display rather than any of the other modules, such as moving a window from one side of the UI to the other. In some embodiments, the UI interaction and generation module 1205 generates a basic GUI and populates the GUI with information from the other modules and stored data (e.g., the document data 1235).

The document editor 1210 includes a high-resolution document creator 1280, an image annotation creator 1285, an image down sampler 1290, and a maximum required image resolution calculator 1295, as well as additional editing modules 1250. The document editor 1210 enables a user to create documents (e.g., word processing documents, electronic books, etc.) with a variety of text, equations, media (e.g., audio, video), electronic book constructs (e.g., graphs, sidebars, popovers, etc.), and other features. The modules are described in more detail by reference to FIG. 13 below.

The additional editing modules 1250 enable various additional editing features. These features include formatting of electronic documents, addition of media and other constructs (e.g., graphs, sidebars, popovers, etc.) to electronic documents, spellchecking and other review features, etc.

The preview generator 1215 of some embodiments generates a preview of an electronic document (e.g., an electronic book) in order to allow a user to see how a document currently being edited will look in its final form. In some embodiments, the preview generator 1215 generates the preview of the document and sends this preview to an external electronic document reader device (e.g., a smart phone, a table computer, a specialized e-book reader, etc.). In addition, in some embodiments the preview generator can send the preview to the UI interaction and generation module 1205 for display in the authoring application user interface.

The document publisher 1220 of some embodiments generates a final version of an electronic document (e.g., an e-book in either a standardized or proprietary format) for sending out (e.g., via the network interface 1275) to a content distribution system. In some embodiments, the document publisher 1220 creates the electronic document and/or a sample version of the electronic document, and a separate application connects to the content distribution system in order to upload (publish) the document.

While many of the features of content authoring and publishing application 1200 have been described as being performed by one module (e.g., the UI interaction and generation module 1205, the document publisher 1220, etc.), one of ordinary skill in the art will recognize that the functions described herein might be split up into multiple modules. Similarly, functions described as being performed by multiple different modules might be performed by a single module in some embodiments (e.g., the preview generator 1215 might actually be part of the document publisher 1220).

Figure 13:
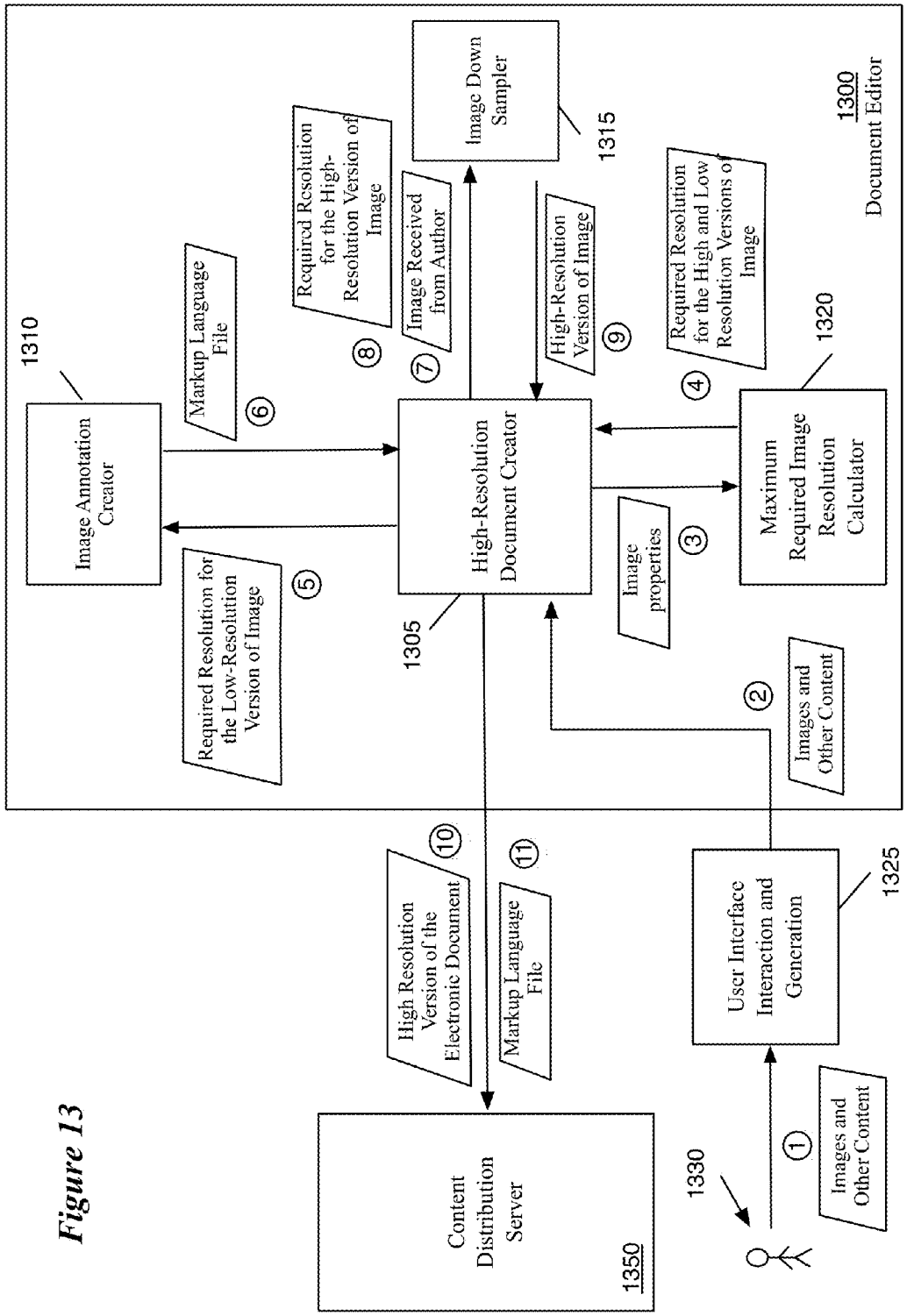
FIG. 13 conceptually illustrates a portion of a high-level software architecture of a content authoring and publishing application of some embodiments.

FIG. 13 conceptually illustrates a portion of a high-level software architecture of a document editor of some embodiments. Some of the operations of process 300 as well as the operation described by reference to FIG. 4 are performed by one or more modules in FIG. 13. As shown, the document editor 1300 includes the following modules: high-resolution document creator 1305, image annotation creator 1310, image down sampler 1315, and maximum required image resolution calculator 1320. These modules interact with a user 1330 through user interface interaction and generation module 1325. One of ordinary skill in the art would recognize that the modules shown in FIG. 13 are specific to the process for annotating the high-version of an electronic document for creating a low-resolution version of document in some embodiments and that the document editor of some embodiments includes numerous additional modules which are not shown in this figure.

As shown in FIG. 13, the user interface interaction and generation module 1325 receives images and other content (as shown by encircled 1) from the author 1330 of the document. For instance, user interface interaction and generation module 1325 provides a user interface such as the interface shown in FIG. 4 and receives different content from the author. The user interface interaction and generation module 1325 sends the received content to high-resolution document creator 1305 (as shown by encircled 2).

The high-resolution document creator module 1305 sends (as shown by encircled 3) image properties (such as the size of the image on a page and whether the image can be zoomed or enlarged) to maximum required image resolution calculator module 1320. The maximum required image resolution calculator module 1320 calculates the maximum required resolution for the low-resolution and/or high-resolution versions of each image and sends the results (as shown by encircled 4) to the high-resolution document creator module 1305.

The high-resolution document creator module 1305 also sends (as shown by encircled 5) to the image annotation creator module 1310. The image annotation creator module 1310 annotates the markup language file with the proper annotations and sends (as shown by encircled 6) the markup language file to high-resolution document creator module 1305.

When a high-resolution image has more resolution than is needed for displaying the image on a high-resolution display screen, the high-resolution document creator module 1305 sends (as shown by encircled 7) the image received from the author as well as the required resolution (as shown by encircled 8) to the image down sampler module 1315, which down samples the received image and creates the high-resolution version of the image with enough pixels as needed for displaying on a high-resolution display screen. The image down sampler module 1315 sends (as shown by encircled 9) the down sampled high-resolution version of the image to high-resolution document creator 1305, which includes the image in the high-resolution version of the document.

Once the high-resolution version of the electronic document is completed, the high-resolution document creator sends the high-resolution version of the document (as shown by encircled 10) and the associated markup language file (as shown by encircled 11) to the content distribution system 1350.

B. Electronic Document Thinning Tool

Figure 14:
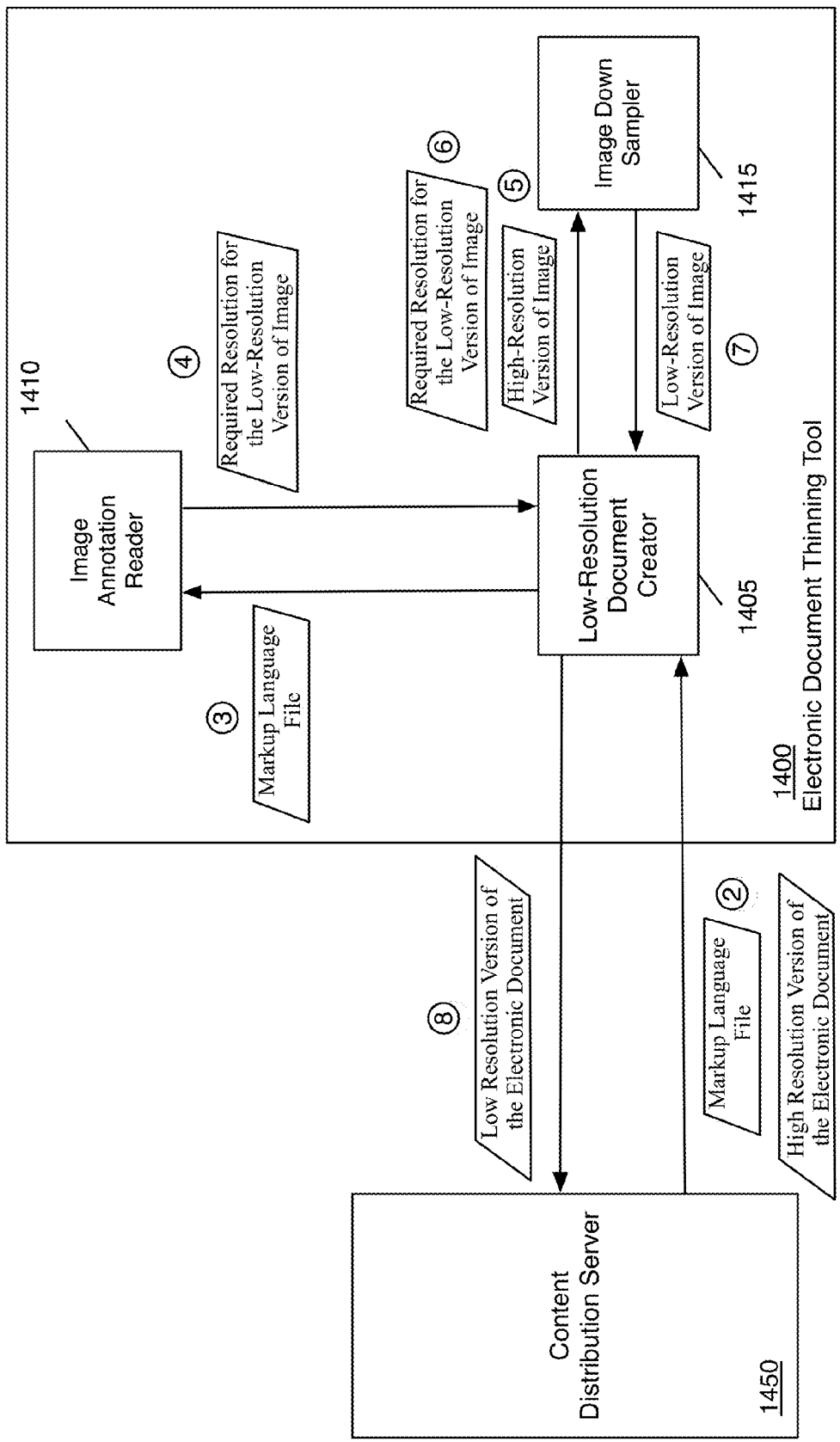
FIG. 14 conceptually illustrates a portion of a high-level software architecture of an electronic document thinning tool of some embodiments.

FIG. 14 conceptually illustrates a portion of a high-level software architecture of an electronic document thinning tool of some embodiments. Some of the operations of process 800 are performed by one or more modules in FIG. 14. As shown, the electronic document thinning tool 1400 includes the following modules: low-resolution document creator 1405, image annotation Reader 1410, and image down sampler 1415. One of ordinary skill in the art would recognize that the modules shown in FIG. 14 are specific to the process for thinning high-resolution images in some embodiments and that content distribution system of some embodiments includes numerous additional modules which are not shown in this figure.

As shown in FIG. 14, the low-resolution document creator module 1405 receives the high-resolution version of an electronic document (as shown by encircled 1) and the associated markup language file (as shown by encircled 2) from one of the content distribution servers 1450. The low-resolution document creator module 1405 sends (as shown by encircled 3) the markup language file to the image annotation reader module 1410.

The image annotation reader module 1410 module reads the annotations associated with each image and determines the resolution required (i.e., the number of pixels required) for the low-resolution version of each image. The image annotation reader module 1410 module sends the resolution required for the low-resolution version of each image (as shown by encircled 4) to low-resolution document creator 1405.

The low-resolution document creator 1405 sends the high-resolution version of each image (as shown by encircled 5) and the required resolution for the low-version of the image (as shown by encircled 6) to image down sampler 1415. Image down sampler 1415 down samples the high-resolution of each image to create the low-resolution version of the image. Image down sampler 1415 sends the low-resolution version of each image (as shown by encircled 7) to low-resolution document creator 1405. The low-resolution document creator 1405 creates a low-resolution version of the electronic document by replacing the high-resolution of each image with the low-resolution version. The low-resolution document creator 1405 sends the low-resolution version of the electronic document (as shown by encircled 8) to the content distribution server.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 15:
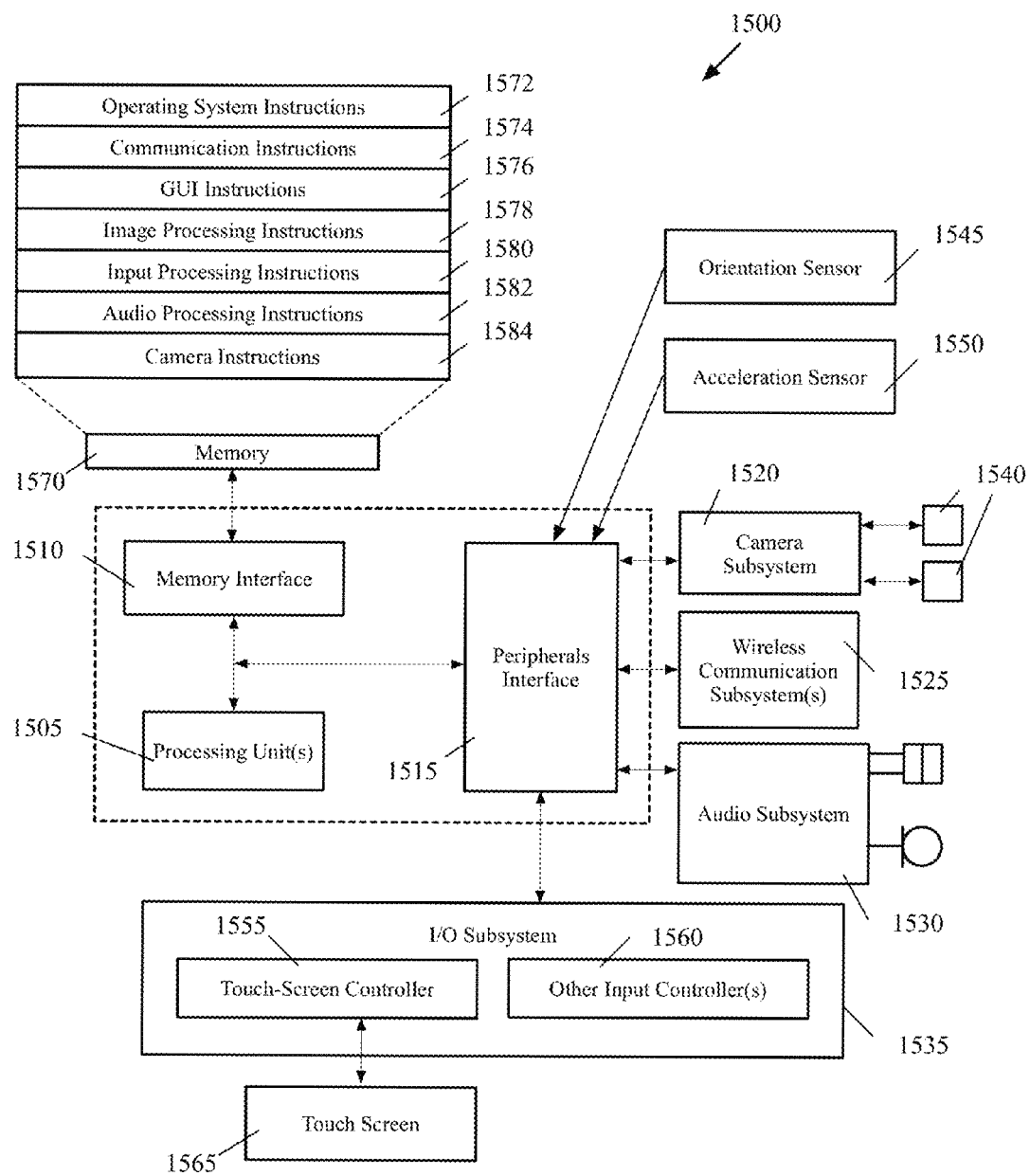
FIG. 15 is an example of an architecture of a mobile computing device in some embodiments of the invention.

Several applications such as the content authoring and publishing application, the digital content viewing application, and multimedia management application of some embodiments operate on mobile devices, such as smart phones (e.g., iPhones®), tablets and touchpads (e.g., iPads®), or ebook readers (e.g., Kindle®). FIG. 15 is an example of an architecture 1500 of such a mobile computing device. As shown, the mobile computing device 1500 includes one or more processing units 1505, a memory interface 1510 and a peripherals interface 1515.

The peripherals interface 1515 is coupled to various sensors and subsystems, including a camera subsystem 1520, a wireless communication subsystem(s) 1525, an audio subsystem 1530, an I/O subsystem 1535, etc. The peripherals interface 1515 enables communication between the processing units 1505 and various peripherals. For example, an orientation sensor 1545 (e.g., a gyroscope) and an acceleration sensor 1550 (e.g., an accelerometer) are coupled to the peripherals interface 1515 to facilitate orientation and acceleration functions.

The camera subsystem 1520 is coupled to one or more optical sensors 1540 (e.g., a charged coupled device (CCD) optical sensor, a complementary metal-oxide-semiconductor (CMOS) optical sensor, etc.). The camera subsystem 1520 coupled with the optical sensors 1540 facilitates camera functions, such as image and/or video data capturing. The wireless communication subsystem 1525 serves to facilitate communication functions. In some embodiments, the wireless communication subsystem 1525 includes radio frequency receivers and transmitters, and optical receivers and transmitters (not shown in FIG. 15). These receivers and transmitters of some embodiments are implemented to operate over one or more communication networks such as a GSM network, a Wi-Fi network, a Bluetooth network, etc. The audio subsystem 1530 is coupled to a speaker to output audio (e.g., to output user-specific questions for generating the escrow key). Additionally, the audio subsystem 1530 is coupled to a microphone to facilitate voice-enabled functions, such as voice recognition (e.g., for searching), digital recording, etc.

The I/O subsystem 1535 involves the transfer between input/output peripheral devices, such as a display, a touch screen, etc., and the data bus of the processing units 1505 through the peripherals interface 1515. The I/O subsystem 1535 includes a touch-screen controller 1555 and other input controllers 1560 to facilitate the transfer between input/output peripheral devices and the data bus of the processing units 1505. As shown, the touch-screen controller 1555 is coupled to a touch screen 1565. The touch-screen controller 1555 detects contact and movement on the touch screen 1565 using any of multiple touch sensitivity technologies. The other input controllers 1560 are coupled to other input/control devices, such as one or more buttons. Some embodiments include a near-touch sensitive screen and a corresponding controller that can detect near-touch interactions instead of or in addition to touch interactions.

The memory interface 1510 is coupled to memory 1570. In some embodiments, the memory 1570 includes volatile memory (e.g., high-speed random access memory), non-volatile memory (e.g., flash memory), a combination of volatile and non-volatile memory, and/or any other type of memory. As illustrated in FIG. 15, the memory 1570 stores an operating system (OS) 1572. The OS 1572 includes instructions for handling basic system services and for performing hardware dependent tasks.

The memory 1570 also includes communication instructions 1574 to facilitate communicating with one or more additional devices; graphical user interface instructions 1576 to facilitate graphic user interface processing; image processing instructions 1578 to facilitate image-related processing and functions; input processing instructions 1580 to facilitate input-related (e.g., touch input) processes and functions; audio processing instructions 1582 to facilitate audio-related processes and functions; and camera instructions 1584 to facilitate camera-related processes and functions. The instructions described above are merely exemplary and the memory 1570 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 15 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 15 may be split into two or more integrated circuits.

B. Computer System

Figure 16:
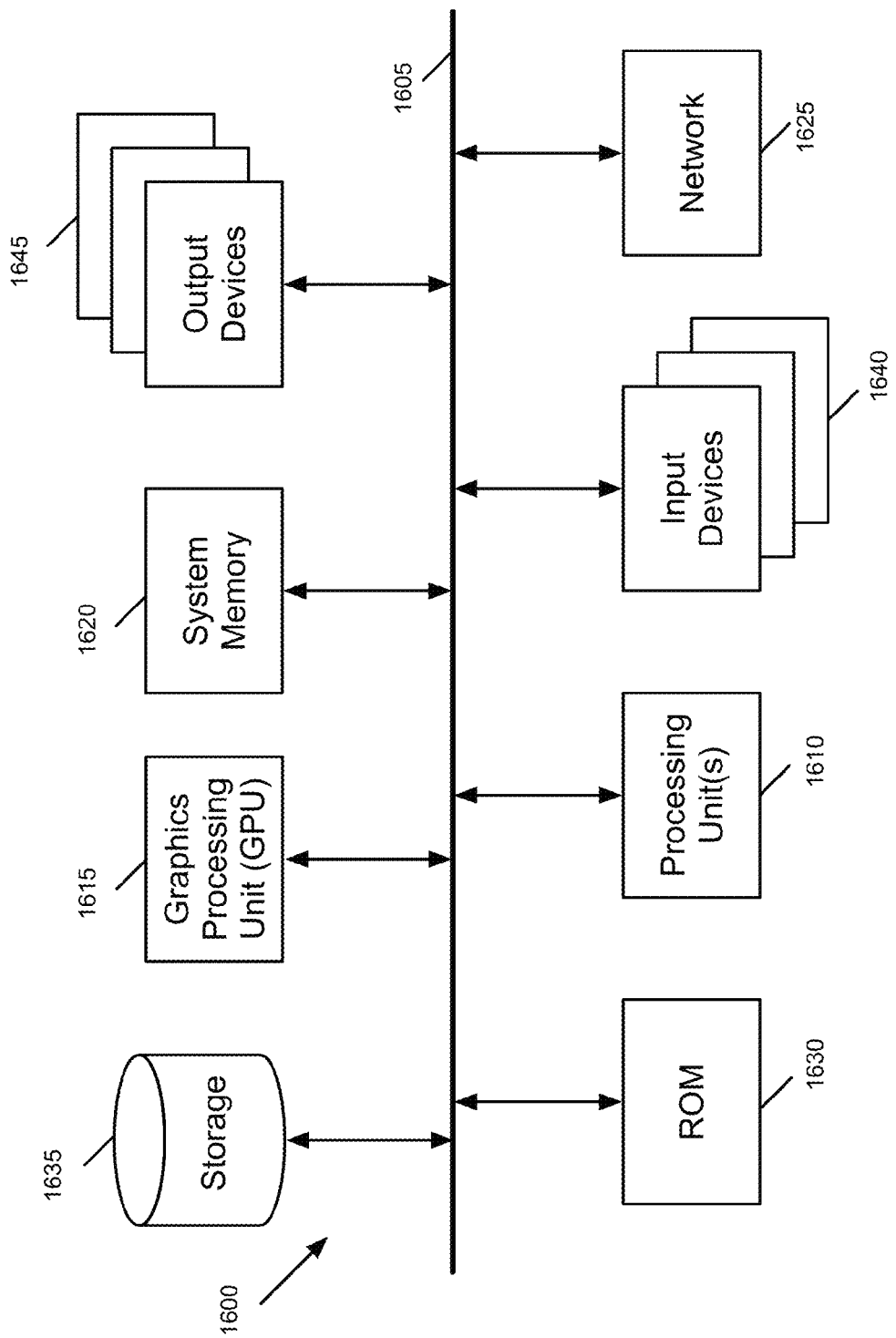
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding disk drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 8, 10, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for generating a low-resolution version of an electronic document at a content distribution system, the method comprising:
   from a content publishing application, receiving (i) a high-resolution version of the electronic document that comprises a plurality of high-resolution images and (ii) a markup language file associated with the high-resolution version of the electronic document, the markup language file comprising a plurality of annotations that each specify a resolution for a low-resolution version of a respective high-resolution image, the specified resolution identifying a maximum pixel width and pixel height resolution at which the respective image will be displayed on client devices having a particular resolution, wherein the low-resolution version of the electronic document is not received by the content distribution system from the content publishing application;
   creating, at the content distribution system, the low-resolution version of each respective high-resolution image of the plurality of high-resolution images based on the respective annotation of the plurality of annotations;

generating, at the content distribution system, the low-resolution version of the electronic document using the created low-resolution image; and storing (i) the high-resolution version of the electronic document with the high-resolution image for distribution to a first plurality of client devices and (ii) the low-resolution version of the electronic document with the low-resolution image for distribution to a second plurality of client devices having the particular resolution.

2. The method of claim 1, wherein the high-resolution version of the electronic document is received from a device that is utilized to author the document.

3. The method of claim 1, wherein the markup language file further comprises a list of content included in the document, a reading order, and metadata associated with the content included in the document.

4. The method of claim 1 further comprising:
at the content distribution system, receiving (i) a first request from a first client device to access the electronic document and (ii) display capabilities of the first client device that indicate a resolution of the first client device;
sending the low-resolution version of the document from the content distribution system to the first client device based on the display capabilities of the first client device;
at the content distribution system, receiving (i) a second request from a second client device to access the electronic document and (ii) display capabilities of the second client device that indicate a resolution of the second client device; and
sending the high-resolution version of the document from the content distribution system to the second client device based on the display capabilities of the second client device.

5. The method of claim 4, wherein sending the low-resolution version of the document to the first client device based on the display capabilities comprises sending the low-resolution version of the electronic document when the first client device has the particular resolution.

6. A method for publishing an electronic document, the method comprising:
receiving a plurality of high-resolution images to include in the electronic document;
determining a maximum pixel width and pixel height resolution at which each high-resolution image of the plurality of high-resolution images will be displayed when the document is displayed on display screens having a particular resolution, wherein the maximum resolution needed to display at least a subset of the high-resolution images on the display screens having the particular resolution is lower than a resolution of the high-resolution images;
associating a markup file with the high-resolution version of the electronic document, the markup language file comprising a plurality of annotations that each specifies the determined maximum resolution for a respective high-resolution image; and
publishing the high-resolution version of the document and the associated markup file to a content distribution system without a low-resolution version of the document, wherein the content distribution system generates the low-resolution version of the electronic document by using the plurality of annotations to create a low-resolution version of each image having the determined maximum resolution for the image, the low-resolution version of the electronic document for distribution by the content distribution system to a plurality of client devices with display screens having the particular resolution and the high-resolution version of the electronic document for distribution by the content distribution system to a different plurality of client devices.

7. The method of claim 6, wherein the electronic document is one of an electronic book, an electronic magazine, and an electronic newspaper.

8. The method of claim 6, wherein the low-resolution version of the electronic document is generated by the content distribution system without receiving low-resolution versions of the high-resolution images.

9. The method of claim 6, wherein the markup language file further comprises a list of content included in the document, a reading order of the document, and metadata associated with the content included in the document.

10. The method of claim 6 further comprising including the high-resolution images in the high-resolution version of the electronic document, wherein including the high-resolution images comprises:
determining a maximum resolution needed to display each of the images on a high-resolution device;
for each of the images that have a higher resolution than the maximum resolution needed to display the images on a high-resolution device:
creating a version of the high-resolution image at the maximum resolution needed to display the image on the high-resolution device; and
including the created version of the image in the high-resolution version of the electronic document.

11. The method of claim 10 further comprising, for each of the images that does not have a higher resolution than the maximum resolution needed to display the image on a high-resolution device, including the high-resolution image in the high-resolution version of the document.

12. A non-transitory machine-readable medium storing a program for generating a low-resolution version of an electronic document at a content distribution system, the program executable by at least one processing unit, the program comprising sets of instructions for:
from a content publishing application, receiving (i) a high-resolution version of the electronic document that comprises a plurality of high-resolution images and (ii) a markup language file associated with the high-resolution version of the electronic document, the markup language file comprising a plurality of annotations that each specify a resolution for a low-resolution version of a respective high-resolution image, the specified resolution identifying a maximum pixel width and pixel height resolution at which the respective image will be displayed on client devices having a particular resolution, wherein the low-resolution version of the electronic document is not received by the content distribution system from the content publishing application;
creating, at the content distribution system, the low-resolution version of each respective high-resolution image of the plurality of high-resolution images based on the respective annotation of the plurality of annotations;
generating, at the content distribution system, the low-resolution version of the electronic document using the created low-resolution image; and
storing (i) the high-resolution version of the electronic document with the high-resolution image for distribution to a first plurality of client devices and; (ii) the low-resolution version of the electronic document with the low-resolution image for distribution to a second plurality of client devices having the particular resolution.

13. The non-transitory machine-readable medium of claim 12, wherein the high-resolution version of the electronic document is received from a device that is utilized to author the document.

14. The non-transitory machine-readable medium of claim 12, wherein the markup language file further comprises a list of content included in the document, a reading order, and metadata associated with the content included in the document.

15. The non-transitory machine-readable medium of claim 12, wherein the electronic document is one of an electronic book, an electronic magazine, and an electronic newspaper.

16. The non-transitory machine readable medium of claim 12, wherein the program further comprises sets of instructions for:
  at the content distribution system, receiving (i) a first request from a first client device to access the electronic document and (ii) display capabilities of the first client device that indicate a resolution of the first client device;
  sending the low-resolution version of the document from the content distribution system to the first client device based on the display capabilities of the first client device;
  at the content distribution system, receiving (i) a second request from a second client device to access the electronic document and (ii) display capabilities of the second client device that indicate a resolution of the second client device; and
  sending the high-resolution version of the document from the content distribution system to the second client device based on the display capabilities of the second client device.

17. A non-transitory machine-readable medium storing a program for publishing an electronic document, the program executable by at least one processing unit, the program comprising sets of instructions for:
  receiving a plurality of high-resolution images to include in the electronic document;
  determining a maximum pixel width and pixel height resolution at which each high-resolution image of the plurality of high-resolution images will be displayed when the document is displayed on display screens having a particular resolution, wherein the maximum resolution needed to display at least a subset of the high-resolution images on the display screens having the particular resolution is lower than a resolution of the high-resolution images;
  associating a markup file with the high-resolution version of the electronic document, the markup language file comprising a plurality of annotations that each specifies the determined maximum resolution for a respective high-resolution image; and
  publishing the high-resolution version of the document and the associated markup file to a content distribution system without a low-resolution version of the document, wherein the content distribution system generates the low-resolution version of the electronic document by using the plurality of annotations to create a low-resolution version of each image having the determined maximum resolution for the image, the low-resolution version of the electronic document for distribution by the content distribution system to a plurality of client devices with display screens having the particular resolution and the high-resolution version of the electronic document for distribution by the content distribution system to a different plurality of client devices.

18. The non-transitory machine-readable medium of claim 17, wherein the electronic document is one of an electronic book, an electronic magazine, and an electronic newspaper.

19. The non-transitory machine-readable medium of claim 17, wherein the low-resolution version of the electronic document is generated by the content distribution system without receiving low-resolution versions of the high-resolution images.

20. The non-transitory machine-readable medium of claim 17, wherein the markup language file further comprises a list of content included in the document, a reading order of the document, and metadata associated with the content included in the document.

21. The non-transitory machine-readable medium of claim 17 wherein the program further comprises a set of instructions for including the high-resolution images in the high-resolution version of the electronic document, wherein the set of instructions for including the high-resolution images comprises sets of instructions for:
  determining a maximum resolution needed to display each of the images on a high-resolution device;
  for each of the images that have a higher resolution than the maximum resolution needed to display the images on a high-resolution device:
    creating a version of the high-resolution image at the maximum resolution needed to display the image on the high-resolution device; and
    including the created version of the image in the high-resolution version of the electronic document.

22. The non-transitory machine-readable medium of claim 21, wherein the program further comprises a set of instructions for including the high-resolution image in the high-resolution version of the document for each of the images that does not have a higher resolution than the maximum resolution needed to display the image on a high-resolution device.

* * * * *